United States Patent
Basu Mallick et al.

(10) Patent No.: US 11,621,766 B2
(45) Date of Patent: *Apr. 4, 2023

(54) PROSE RELAY UE ACTIVATION

(71) Applicant: Panasonic Intellectual Property Corporation of America, Torrance, CA (US)

(72) Inventors: Prateek Basu Mallick, Hessen (DE); Joachim Loehr, Hessen (DE); Takako Hori, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 50 days.

This patent is subject to a terminal disclaimer.

(21) Appl. No.: 17/231,557

(22) Filed: Apr. 15, 2021

(65) Prior Publication Data

US 2021/0250082 A1 Aug. 12, 2021

Related U.S. Application Data

(63) Continuation of application No. 17/031,388, filed on Sep. 24, 2020, now Pat. No. 11,012,145, which is a (Continued)

(30) Foreign Application Priority Data

Jul. 24, 2015 (EP) .................................... 15002195

(51) Int. Cl.
*H04B 7/155* (2006.01)
*H04W 88/04* (2009.01)
(Continued)

(52) U.S. Cl.
CPC ........ *H04B 7/15557* (2013.01); *H04W 8/005* (2013.01); *H04W 52/0229* (2013.01); *H04W 88/04* (2013.01); *Y02D 30/70* (2020.08)

(58) Field of Classification Search
CPC .............. H04B 7/15557; H04W 8/005; H04W 52/0229; H04W 88/04
See application file for complete search history.

(56) References Cited

U.S. PATENT DOCUMENTS 7,702,280 B2    4/2010  Takeda et al.
10,819,417 B2 * 10/2020  Basu Mallick ....... H04W 8/005
(Continued)

FOREIGN PATENT DOCUMENTS

EP      2 833 694 A2    2/2015
WO      2013/163595 A2  10/2013
(Continued)

OTHER PUBLICATIONS

3GPP TR 23.713, V1.4.0, "3rd Generation Partnership Project; Technical Specification Group Services and System Aspects; Study on extended architecture support for proximity-based services (Release 13)", Jun. 2015.
(Continued)

*Primary Examiner* — Myron Wyche
(74) *Attorney, Agent, or Firm* — Seed IP Law Group LLP

(57) ABSTRACT

The present disclosure relates to a method for activating a relay functionality of a ProSe capable and relay-capable user equipment within a mobile communication network. The radio base station, to which the relay UE is connected, determines whether further relays are necessary in the radio cell controlled by the radio base station. In case further relays are necessary in the radio cell, the radio base station selects a persistence check value and transmits a broadcast message in the radio cell. The broadcast message at least indicates that further relays are necessary and comprises the selected persistence check value. Upon receiving the broadcast message, the relay UE activates its relay functionality in case it determines that relay requirements for activating its relay functionality in the radio cell are fulfilled and in case
(Continued)

a persistence check performed by the relay UE based on the received persistence check value is successful.

19 Claims, 16 Drawing Sheets

Related U.S. Application Data continuation of application No. 16/655,787, filed on Oct. 17, 2019, now Pat. No. 10,819,417, which is a continuation of application No. 16/199,884, filed on Nov. 26, 2018, now Pat. No. 10,498,431, which is a continuation of application No. 15/650,696, filed on Jul. 14, 2017, now Pat. No. 10,177,834, which is a continuation of application No. PCT/JP2016/002878, filed on Jun. 15, 2016.

(51) Int. Cl.
*H04W 8/00* (2009.01)
*H04W 52/02* (2009.01)

(56) References Cited

U.S. PATENT DOCUMENTS

| | | |
|---|---|---|
| 2006/0285505 A1 | 12/2006 | Cho et al. |
| 2007/0002766 A1 | 1/2007 | Park et al. |
| 2013/0235791 A1 | 9/2013 | Abraham et al. |
| 2014/0112158 A1 | 4/2014 | Tavildar et al. |
| 2014/0133332 A1 | 5/2014 | Lee |
| 2014/0171062 A1 | 6/2014 | Fallgren et al. |
| 2015/0029866 A1 | 1/2015 | Liao et al. |
| 2015/0146577 A1 | 5/2015 | Kim et al. |
| 2016/0135239 A1 | 5/2016 | Khoryaev et al. |
| 2017/0013653 A1 | 1/2017 | Suzuki et al. |
| 2018/0098370 A1 | 4/2018 | Bangolae et al. |

FOREIGN PATENT DOCUMENTS

| | | |
|---|---|---|
| WO | 2014/077580 A1 | 5/2014 |
| WO | 2015/003365 A1 | 1/2015 |

OTHER PUBLICATIONS

3GPP TR 36.843, V12.0.1, "3rd Generation Partnership Project; Technical Specification Group Radio Access Network; Study on LTE Device to Device Proximity Services; Radio Aspects (Release 12)", Mar. 2014.
3GPP TS 23.303, V13.0.0, "3rd Generation Partnership Project; Technical Specification Group Services and System Aspects; Proximity-based services (ProSe); Stage 2(Release 13)", Jun. 2015.
3GPP TS 25.321, V12.2.0, "3rd Generation Partnership Project; Technical Specification Group Radio Access Network; Medium Access Control (MAC) protocol specification (Release 12)", Dec. 2014.
3GPP TS 36.211, V12.6.0, "3rd Generation Partnership Project; Technical Specification Group Radio Access Network; Evolved Universal Terrestrial Radio Access (E-UTRA); Physical Channels and Modulation (Release 12)", Jun. 2015.
3GPP TS 36.212, V12.4.0, "3rd Generation Partnership Project; Technical Specification Group Radio Access Network; Evolved Universal Terrestrial Radio Access (E-UTRA); Multiplexing and channel coding (Release 12)", Mar. 2015.
3GPP TS 36.300, V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Mar. 2016.
3GPP TS 36.304, V12.5.0, "3rd Generation Partnership Project; Technical Specification Group Radio Access Network; Evolved Universal Terrestrial Radio Access (E-UTRA); User Equipment (UE) procedures in idle mode (Release 12)", Jun. 2015.
3GPP TS 36.331, V12.6.0, "3rd Generation Partnership Project; Technical Specification Group Radio Access Network; Evolved Universal Terrestrial Radio Access (E-UTRA); Radio Resource Control (RRC); Protocol specification (Release 12)", Jun. 2015.
3GPP Work Item Description, "Relays for LTE—Core part," RP-110911, 10 pages.
Alcatel-Lucent, Alcatel-Lucent Shanghai Bell, "ProSe UE-to-Network Relay Initiation," R2-152677, Agenda Item: 7.5.1, 3GPP TSG-RAN WG2 Meeting #90, Fukuoka, Japan, May 25-29, 2015, 2 pages.
Etri, "Procedure for UE-to-Network Relay selection/reselection," R2-152419, Agenda Item: 7.5.1.1, 3GPP TSG RAN WG2 #90, Fukuoka, Japan, May 25-29, 2015, 4 pages.
Huawei, HiSilicon, "Relay UE selection for UE-to-Network relay," R1-151278, Agenda Item: 7.2.3.2.1, 3GPP TSG RAN WG1 Meeting #80bis, Belgrade, Serbia, Apr. 20-24, 2015, 3 pages.
International Search Report of PCT application No. PCT/JP2016/002878 dated Jul. 19, 2016.
Intel Corporation: "Signalling considerations for UE-to-Network relay initiation", 3GPP Draft; R2-152165, 3rd Generation Partnership Project (3GPP), Mobile Competence Centre ; 650, Route Des Lucioles ; F-06921 Sophia-Antipolis Cedex; France, vol. RAN WG2, Meeting #90. Fukuoka, Japan; May 25, 2015-May 29, 2015, May 25-29, 2015, XP050972649.
RAN2 Chairman (Ericsson), "Proposed Agenda," R2-152001, 3GPP TSG RAN WG2 #90, Fukuoka, Japan, May 25-29, 2015, 12 pages.
Sony, "Discussion on UE-to-Network Relay measurement," R1-153087, Agenda Item 6.2.3.1, 3GPP TSG RAN WG1 Meeting #81, Fukuoka, Japan, May 25-29, 2015, 4 pages.
The Extended European Search Report dated Feb. 5, 2020 for the related European Patent Application No. 19199663.6-1220, 10 pages.
ZTE: "Discussions on Relay UE selection and discovery",3GPP DRAFT; R1-152966 Relay UE Selection and Discovery, 3rd Generation Partnership Project (3GPP), Mobile Competence Centre 650, Route Des Lucioles ; F-06921 Sophia-Antipolis Cedex ; France,vol. RAN WG1, Meeting #81, Fukuoka, Japan; May 25, 2015-May 29, 2015, May 25-29, 2015, XP050972166.

\* cited by examiner

STATE 1: UL COVERAGE
STATE 2: DL COVERAGE
STATE 3: CP UE-RELAY COVERAGE
STATE 4: OUT OF COVERAGE

PROSE RELAY UE ACTIVATION

BACKGROUND

Technical Field

The present disclosure relates to methods for activating a relay functionality of a relay user equipment. The present disclosure is also providing the relay user equipment and corresponding radio base station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N^{DL}_{RB} * N^{RB}_{SC}$ subcarriers and $N^{DL}_{symb}$ OFDM symbols. $N^{DL}_{RB}$ is the number of resource blocks within the bandwidth. The quantity NDLRB depends on the downlink transmission bandwidth configured in the cell and shall fulfill $$N_{RB}^{min,DL} \leq N_{RB}^{DL} \leq N_{RB}^{max,DL},$$

where $N^{min,DL}{}_{RB}=6$ and $N^{max,DL}{}_{RB}=110$ are respectively the smallest and the largest downlink bandwidths, supported by the current version of the specification. $N^{RB}{}_{SC}$ is the number of subcarriers within one resource block. For normal cyclic prefix subframe structure, $N^{RB}{}_{SC}=12$ and $N^{DL}{}_{symb}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.9, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:

1. For each SCell the usage of uplink resources by the UE in addition to the downlink ones is configurable (the number of DL SCCs configured is therefore always larger or equal to the number of UL SCCs, and no SCell can be configured for usage of uplink resources only)

2. The downlink PCell cannot be de-activated, unlike SCells

3. Re-establishment is triggered when the downlink PCell experiences Rayleigh fading (RLF), not when downlink SCells experience RLF 4. Non-access stratum information is taken from the downlink PCell 5. PCell can only be changed with handover procedure (i.e., with security key change and RACH procedure)

6. PCell is used for transmission of PUCCH

7. The uplink PCell is used for transmission of Layer 1 uplink control information 8. From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the present disclosure the terms "D2D", "ProSe" and "sidelink" are interchangeable.

D2D Communication in LTE

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface and will be described in more detail later.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the user plane protocols, part of the agreement from D2D communication perspective is given in the following (see also 3GPP TR 36.843 current version 12.0.1 section 9.2.2, incorporated herein by reference):

PDCP:
  1:M D2D broadcast communication data (i.e., IP packets) should be handled as the normal user-plane data.
  Header-compression/decompression in PDCP is applicable for 1:M D2D broadcast communication.
    U-Mode is used for header compression in PDCP for D2D broadcast operation for public safety;

RLC:
  RLC UM is used for 1:M D2D broadcast communication.
  Segmentation and Re-assembly is supported on L2 by RLC UM.
  A receiving UE needs to maintain at least one RLC UM entity per transmitting peer UE.
  An RLC UM receiver entity does not need to be configured prior to reception of the first RLC UM data unit.

So far no need has been identified for RLC AM or RLC TM for D2D communication for user plane data transmission.

MAC:
- No HARQ feedback is assumed for 1:M D2D broadcast communication
- The receiving UE needs to know a source ID in order to identify the receiver RLC UM entity.
- The MAC header comprises a L2 target ID which allows filtering out packets at MAC layer.
- The L2 target ID may be a broadcast, group cast or unicast address.
  - L2 Groupcast/Unicast: A L2 target ID carried in the MAC header would allow discarding a received RLC UM PDU even before delivering it to the RLC receiver entity.
  - L2 Broadcast: A receiving UE would process all received RLC PDUs from all transmitters and aim to re-assemble and deliver IP packets to upper layers.
- MAC sub header contains LCIDs (to differentiate multiple logical channels).
- At least Multiplexing/de-multiplexing, priority handling and padding are useful for D2D.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in 3GPP TR 23.713 current version v1.4.0 section 7.1.2 incorporated herein by reference:
- Establishment of a secure layer-2 link over PC5.
- IP address/prefix assignment.
- Layer-2 link maintenance over PC5.
- Layer-2 link release over PC5.

FIG. 3 discloses how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

At least the following standard IETF mechanisms can be used for IP address/prefix assignment:
- DHCP-based IP address configuration for assignment of an IPv4 address.
- IPv6Stateless Address auto configuration specified in RFC 4862 for assignment of an IPv6 prefix.

One of the two UEs acts as a DHCP server or an IPv6 default router. In the ProSe UE-NW Relay case (also see later chapter on ProSe relay), the relay acts as DHCP server or IPv6 default router for all Remote UEs that connect to it over a secure layer-2 link over PC5.

UEs engaging in isolated (non-relay) one-to-one communication may also use link-local addresses.

The PC5 Signaling Protocol shall support keep-alive functionality that is used to detect when the UEs are not in ProSe Communication range, so that they can proceed with implicit layer-2 link release.

The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.3.0 defines in sub-clause 8.3 the following identities to use for ProSe Direct Communication:
- SL-RNTI: Unique identification used for ProSe Direct Communication Scheduling;
- Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver;
- Destination Layer-2 ID: Identifies the target of the data in sidelink ProSe Direct Communication. The Destination Layer-2 ID is 24 bits long and is split in the MAC layer into two bit strings:
  - One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.
  - Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation.

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined, e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary Prose-CommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send BSR) via PDCCH, scrambled by C-RNTI;

Step 3: UE sends D2D BSR indicating the buffer status via PUSCH;

Step 4: eNB grants D2D resource (for UE to send data) via PDCCH, scrambled by D2D-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 12.4.0, subclause 5.4.3, incorporated herein by reference, defining in particular the SCI format 0.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 5 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

ProSe Network Architecture and ProSe Entities

FIG. 6 illustrates a high-level exemplary architecture for a non-roaming case, including different ProSe applications in the respective UEs A and B, as well as a ProSe Application Server and ProSe function in the network. The example architecture of FIG. 6 is taken from 3GPP TS 23.303 v.13.0.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc., related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

UE Coverage States for D2D

As already mentioned before, the resource allocation method for D2D communication depends apart from the RRC state, i.e., RRC_IDLE and RRC_CONNECTED, also on the coverage state of the UE, i.e., in-coverage, out-of-coverage. A UE is considered in-coverage if it has a serving cell (i.e., the UE is RRC_CONNECTED or is camping on a cell in RRC_IDLE).

The two coverage states mentioned so far, i.e., in-coverage (IC) and out-of-coverage (OOC), are further distinguished into sub-states for D2D. FIG. 7 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e., only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is, strictly speaking, already considered as out-of-coverage (OOC). However, UE3 is in the coverage of some UEs which are themselves (e.g., UE1) in the coverage of the cell, i.e., those UEs can be also referred as CP-relay UEs or simply relay UEs (see also later chapters on ProSe relay). Therefore, the area of the state-3 UEs in FIG. 7 can be denoted as CP UE-relay coverage area. UEs in this state 3 are also referred to as OOC-state-3 UEs. In this state the UEs may receive some cell-specific information which is sent by the eNB (SIB) and forwarded by the CP UE-relay UEs in the coverage of the cell via PD2DSCH to the OOC-state-3 UEs. A (contention-based) network-controlled resource pool is signaled by PD2DSCH.

State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of-coverage devices and legacy E-UTRA transmissions. In general, D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimize interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned.

D2D Discovery

ProSe Direct Discovery is defined as the procedure used by the ProSe-enabled UE to discover other ProSe-enabled UE(s) in its proximity using E-UTRA direct radio signals via PC5. FIG. 8 schematically illustrates the PC5 interface for device-to-device direct discovery.

Upper layer handles authorization for announcement and monitoring of discovery information. For this purpose, UEs have to exchange predefined signals, referred to as "discovery signals". By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned.

There are two types of ProSe Direct Discovery: open and restricted. Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information, e.g., "find a taxi nearby", "find me a coffee shop". Additionally depending on the information obtained, ProSe Direct Discovery can be used for subsequent actions, e.g., to initiate ProSe Direct Communication.

ProSe Direct Discovery Models

The following models for ProSe Direct Discovery are defined in the standard 3GPP TS 23.303, current version 13.0.0, section 5.3 and all subsections thereof, incorporated herein by reference.

Model A ("I am Here"):

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them. This model may be referred to as "I am here" since the announcing UE would broadcast information about itself, e.g., its ProSe Application Code in the discovery message.

Model B ("Who is There?"/"are You There?"):

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It can be referred to as "who is there/are you there" since the discoverer UE sends information for other UEs that would like to receive responses, e.g., the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Resource Allocation for Discovery

D2D communication may either be network-controlled where the operator manages the switching between direct transmissions (D2D) and conventional cellular links, or the direct links may be managed by the devices without operator control. D2D allows combining infrastructure-mode and ad hoc communication.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:
The eNB provides the UE(s) with the resource pool configuration used for announcing of discovery information. The configuration may be, e.g., signaled in SIB.
The UE autonomously selects radio resource(s) from the indicated resource pool and announces discovery information.
The UE can announce discovery information on a randomly selected discovery resource during each discovery period.

Scheduled resource allocation (called Type 2 subsequently): A resource allocation procedure where resources for announcing discovery information are allocated on a per-UE-specific basis, further characterized by:
The UE in RRC_CONNECTED may request resource (s) for announcing of discovery information from the eNB via RRC. The eNB assigns resource(s) via RRC.
The resources are allocated within the resource pool that is configured in UEs for monitoring.

For UEs in RRC_IDLE the eNB may select one of the following options:
The eNB may provide a Type 1 resource pool for discovery information announcement in SIB. UEs that are authorized for Prose Direct Discovery use these resources for announcing discovery information in RRC_IDLE.
The eNB may indicate in SIB that it supports D2D but does not provide resources for discovery information announcement. UEs need to enter RRC Connected in order to request D2D resources for discovery information announcement.

For UEs in RRC_CONNECTED:
A UE authorized to perform ProSe Direct Discovery announcement indicates to the eNB that it wants to perform D2D discovery announcement
The eNB validates whether the UE is authorized for ProSe Direct Discovery announcement using the UE context received from MME.
The eNB may configure the UE to use a Type 1 resource pool or dedicated Type 2 resources for discovery information announcement via dedicated RRC signaling (or no resource).
The resources allocated by the eNB are valid until a) the eNB de-configures the resource (s) by RRC signaling or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Radio Protocol Architecture for ProSe Direct Discovery

FIG. 9 schematically illustrates a Radio Protocol Stack (Access Stratum) for ProSe Direct Discovery, where the access stratum protocol consists of only MAC and PHY. The AS layer performs the following functions:
Interfaces with upper layer (ProSe Protocol): The MAC layer receives the discovery message from the upper layer (ProSe Protocol). The IP layer is not used for transmitting the discovery message;
Scheduling: The MAC layer determines the radio resource to be used for announcing the discovery message received from upper layer;
Discovery PDU generation: The MAC layer builds the MAC PDU carrying the discovery message and sends the MAC PDU to the physical layer for transmission in the determined radio resource. No MAC header is added.

In the UE, the RRC protocol informs the discovery resource pools to MAC. RRC also informs allocated Type 2B resource for transmission to MAC. There is no need for a MAC header. MAC header for discovery does not comprise any fields based on which filtering on L2 could be performed. Discovery message filtering at the MAC level does not seem to save processing or power compared to performing filtering at the upper layers based on the Prose UE- and/or Prose Application ID. The MAC receiver forwards all received discovery messages to upper layers. MAC will deliver only correctly received messages to upper layers. It is assumed that L1 indicates to MAC whether a discovery messages has been received correctly. It is assumed that Upper Layers guarantee to deliver only valid discovery information to the Access Stratum.

ProSe UE-to-Network Relay

A UE may also support the functionality and procedure(s) so as to act as a ProSe UE-to-Network Relay, such that a Remote UE communicates with the ProSe UE-to-Network Relay over the PC5 reference point. ProSe UE-to-Network Relay operation will be specified within 3GPP Release 13. So far, only initial agreements have been made in the 3GPP RAN working groups, some of which can be seen, e.g., from 3GPP TS 23.303 current version 13.0.0 and 3GPP TR 23.713 current version 1.4.0, incorporated herein by reference. Some of those agreements will be listed below. It should however be noted that this work item has been introduced very recently and thus is still in the process of standardization. Consequently, any agreements assumed in the following can still be changed or reversed, and the following agreements, which are assumed for discussion purposes, shall however not be understood as limiting the present disclosure to this particular 3GPP implementation at this very early stage of standardization.

For the ProSe UE-to-Network Relay discovery and ProSe relay (re)selection both scenarios where Remote UEs are in-coverage and out-of-coverage can be addressed.

Relay UE will always be in-coverage. The eNB at the radio level can control whether the UE can act as a relay, whereas whether the network control is per relay UE, per cell (broadcast configuration), or both, or something else is still undecided.

When Remote UE is in-coverage for relay discovery purposes, the monitoring and transmitting resources for discovery can be provided, e.g., by the eNB using the Rel-12 mechanisms (broadcast for idle mode and dedicated signaling for connected mode). The remote UE can decide when to start monitoring.

When the Remote UE is out of coverage, the monitoring and transmitting resources for discovery and communication (actual data transfer) can be provided, e.g., by pre-configuration i.e., by way of specification/operator configuration (in USIM, etc.,) such that the UE exactly knows which resources to use.

ProSe UE-to-Network Relay (re)selection:

The Remote UE can take radio level measurements of the PC5 radio link quality into account for the ProSe UE-to-Network Relay selection procedure.

For the case that the Remote UE is out-of-coverage, the radio level measurements can be used by the remote UE together with other higher layer criteria to perform relay selection.

For the case that Remote UE is out-of-coverage, the criteria for reselection is based on PC5 measurements (RSRP or other RANI agreed measurements) and higher layer criteria. The relay reselection can be triggered by the remote UE.

For the case that the Remote UE is in-coverage, it is not yet decided whether and how these measurements (PC5 measurements) are used (e.g., the measurements can be used by the UE to perform selection similar to out-of-coverage case, or they can be reported to the eNB).

The ProSe UE-to-Network relay may use layer-3 packet forwarding. Control information between ProSe UEs can be exchanged over the PC5 reference point, e.g., for UE-to-Network Relay detection and ProSe Direct Discovery.

A ProSe-enabled UE will also support the exchange of ProSe control information between another ProSe-enabled UE and the ProSe Function over the PC3 reference point. In the ProSe UE-to-Network Relay case, the Remote UE will send this control information over the PC5 user plane to be relayed over the LTE-Uu interface towards the ProSe Function.

The ProSe UE-to-Network Relay entity provides the functionality to support connectivity to "unicast" services for Remote UEs that are not in the coverage area of an eNB, i.e., not connected to E-UTRAN. FIG. 10 shows a ProSe UE-to-Network Relay scenario. The ProSe UE-to-Network Relay shall relay unicast traffic (UL and/or DL) between the Remote UE and the network. The ProSe UE-to-Network Relay shall provide a generic function that can relay any type of traffic that is relevant for public safety communication.

One-to-one Direct Communication between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

ProSe UE-to-Network Relaying may include the following functions:

ProSe Direct discovery following Model A or Model B can be used in order to allow the Remote UE to discover ProSe UE-to-Network Relay(s) in proximity.

ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.

Act as an "announcing" or "discoveree" UE on the PC5 reference point supporting direct discovery.

Act as a default router to the Remote UEs forwarding IP packets between the UE-ProSe UE-to-Network Relay point-to-point link and the corresponding PDN connection.

Handle Router Solicitation and Router Advertisement messages as defined in IETF RFC 4861.

Act as DHCPv4 Server and stateless DHCPv6 Relay Agent.

Act as a NAT if IPv4 is used replacing the locally assigned IPv4 address of the Remote UE with its own.

Map the L2 link ID used by the Remote UE as Destination Layer-2 ID to the corresponding PDN connection supported by the ProSe UE-to-Network Relay.

The user plane protocol architecture for the ProSe UE-to-Network relay is shown in FIG. 11.

ProSe UE-to-Network Relay Discovery

Both Model A and Model B discovery are supported, as discussed before for the usual Rel.-12 direct discovery between two ProSe UEs, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v1.4.0 incorporated herein by reference.

The following parameters are common to all of UE-to-Network Relay Discovery, Group Member Discovery and UE-to-UE Relay Discovery:

Message type: Announcement (Model A) or Solicitation/Response (Model B), Relay Discovery Additional Information (Model A).

Discovery type: indicates whether this is UE-to-Network Relay Discovery, Group Member Discovery or UE-to-UE Relay Discovery.

The following parameters are used in the UE-to-Network Relay Discovery Announcement message (Model A):

ProSe Relay UE ID: link layer identifier that is used for direct communication and is associated with a PDN connection the ProSe UE-to-Network Relay has established.

Announcer info: provides information about the announcing user.

Relay Service Code: parameter identifying a connectivity service the ProSe UE-to-Network Relay provides to Public Safety applications. The Relay Service Codes are configured in a ProSe UE-to-Network relay for advertisement and map in the ProSe UE-to-Network relay to specific APNs they offer connectivity to. Additionally, the Relay Service Code also identifies authorized users the ProSe UE-to-Network relay would offer service to, and may select the related security policies or information, e.g., necessary for authentication and authorization between the Remote UE and the ProSe UE-to-Network Relay (e.g., a Relay Service Code for relays for police members only would be different than a Relay Service code for relays for Fire Fighters only, even though potentially they provided connectivity to same APN, e.g., to support Internet Access).

Radio Layer Information: contains information about the radio layer information, e.g., radio conditions between the eNB and the UE-to-Network Relay, to assist the Remote UE selecting the proper UE-to-Network Relay.

The following parameters are used in the UE-to-Network Relay Discovery Solicitation message (Model B):

Discoverer info: provides information about the discoverer user.

Relay Service Code: information about connectivity that the discoverer UE is interested in. The Relay Service Codes are configured in the Prose Remote UEs interested in related connectivity services.

ProSe UE ID: link layer identifier of the discoverer that is used for direct communication (Model B).

The following parameters are used in the UE-to-Network Relay Discovery Response message (Model B):

ProSe Relay UE ID: link layer identifier that is used for direct communication and is associated with a PDN connection the ProSe UE-to-Network Relay has established.

Discoveree info: provides information about the discoveree.

Radio Layer Information: contains information about the radio layer information, e.g., radio conditions between the eNB and the UE-to-Network Relay, to assist the Remote UE selecting the proper UE-to-Network Relay.

ProSe Direction Communication Via the ProSe UE-to-Network Relay

The UE-to-Network Relay function will be specified based upon an evolution of the ProSe functionality already documented in TS 23.303.

A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). PDN connection(s) supporting UE-to-Network Relay shall only be used for Remote ProSe UE(s) relay traffic. FIG. 12 illustrates the direct communication via a ProSe UE-to-Network Relay.

1. The ProSe UE-Network Relay performs initial E-UTRAN Attach (if not already attached) and/or establishes a PDN connection for relaying (if no appropriate PDN connection for this relaying exists yet). In case of IPv6, the ProSe UE-Network Relay obtains an IPv6 prefix via prefix delegation function from the network as defined in TS 23.401.

2. The Remote UE performs discovery of a ProSe UE-Network Relay using Model A or Model B discovery. The details of this procedure were described before.

3. The Remote UE uses the received relay selection information to select a ProSe UE-Network Relay and then establishes a connection for One-to-One Communication as discussed before with reference to FIG. 3.

4. When IPv6 is used on PC5, the Remote UE performs IPv6 Stateless Address auto-configuration, where the Remote UE shall send a Router Solicitation message (step 4a) to the network using as Destination Layer-2 ID the Layer-2 ID of the Relay in order to solicit a Router Advertisement message (step 4b) as specified in IETF RFC 4862. The Router Advertisement messages shall contain the assigned IPv6 prefix. After the Remote UE receives the Router Advertisement message, it constructs a full IPv6 address via IPv6 Stateless Address auto-configuration in accordance with IETF RFC 4862. However, the Remote UE shall not use any identifiers defined in TS 23.003 as the basis for generating the interface identifier. For privacy, the Remote UE may change the interface identifier used to generate the full IPv6 address, as defined in TS 23.221 without involving the network. The Remote UE shall use the auto-configured IPv6 address while sending packets.

5. When IPv4 is used on PC5, the Remote UE uses DHCPv4. The Remote UE shall send DHCPv4 Discovery (step 5a) message using as Destination Layer-2 ID the Layer-2 ID of the Relay. The ProSe UE-Network Relay acting as a DHCPv4 Server sends the DHCPv4 Offer (step 5b) with the assigned Remote UE IPv4 address. When the Remote UE receives the lease offer, it sends a DHCP REQUEST message containing the received IPv4 address (step 5c). The ProSe UE-Network Relay acting as DHCPv4 server sends a DHCPACK message to the Remote UE (step 5d) including the lease duration and any other configuration information that the client might have requested. On receiving the DHCPACK message, the Remote UE completes the TCP/IP configuration process.

As has been explained above, 3GPP introduces as a major work item the ProSe relay functionality, which includes relay discovery and relay direct communication. Some of the currently-defined mechanisms for ProSe relay are rather inefficient. Other mechanisms are not agreed at all, such as how and when a relay-capable ProSe UE actually starts acting as a relay, i.e., offering the relay service in the radio cell.

BRIEF SUMMARY

One non-limiting and exemplary embodiment provides improved methods for activating the relay functionality of a relay user equipment. The independent claims provide non-limiting and exemplary embodiments. Advantageous embodiments are subject to the dependent claims.

According to several aspects described herein, the activation of the relay functionality in a relay-capable user equipment is improved. In order to discuss these aspects the following assumptions are made. In particular, it is assumed that the relevant relay user equipment is capable of performing direct communications with other remote user equipment(s) (i.e., via a direct sidelink connection). Furthermore, the term "relay-capable user equipment" shall be understood in that the user equipment supports a relay functionality for being capable of serving as a relay respectively for one or more remote user equipments, which eventually entails performing a relay discovery procedure and, upon being selected by a remote user equipment, establishing a direct sidelink connection via which said remote user equipment is connected. Communication between the one or more remote user equipments and a radio base station (to which the relay user equipment is connected) is relayed by the relay user equipment via the established direct sidelink connection.

According to a first aspect, the activation of the relay functionality of a relay user equipment is controlled as follows. The radio base station first determines whether further relays are actually necessary in the radio cell. For example, in order to be able to determine whether further relays are necessary, the radio base station may monitor the number of relay user equipments in the radio cell with an activated relay functionality, and/or the number of remote user equipments in the radio cell which might need to be served by a relay so as to keep being connected to the radio base station and thus to be able to further use the services provided by the communication network (e.g., core and radio network). For the determination, the radio base station may further take into account the number of remote user equipments that are running public safety services in the radio cell. Alternatively, a ProSe function may determine whether further relays are actually necessary in the radio cell of the radio base station and may thus provide a corresponding indication to the radio base station, which in turn, based on this indication, determines that further relays are actually necessary and continues with the relay activation.

As a result, when the radio base station confirms that further relays are necessary in the radio cell, it will broadcast a corresponding broadcast message in its radio cell so is to indicate this, i.e., that further relays are necessary in the radio cell and that the relay-capable user equipments (which have not yet activated their relay functionality) should start the relay activation procedure described below. In other words, the broadcast message from the radio base station can be seen as the relay activation trigger for the corresponding relay user equipments (i.e., those relay-capable user equipments that have no activated relay functionality) to start the relay activation procedure in the relay user equipment to determine whether to activate the relay functionality or not.

Furthermore, the radio base station will select a persistence check value based on the number of further relays that are needed in the radio cell. In particular, the relay activation procedure to be performed in the relay user equipment(s) comprises performing a corresponding persistence check (including generating a random value to be compared to the persistence check value) so as to limit the total number of relay user equipments that will actually activate the relay functionality in response to the trigger. By setting the persistence check value to an appropriate value, the radio base station has implicit control over the maximum number of relay user equipments that might eventually activate the relay functionality.

Furthermore, the relay activation procedure to be performed in the relay user equipments includes a further check, namely whether or not specific relay requirements defined in the radio cell for activating the relay functionality are fulfilled or not by the relay user equipment.

According to this first aspect, the relay user equipment is allowed to activate its relay functionality only if both the persistence check was successful and the relay user equipment fulfils all the necessary relay requirements defined for the radio cell. After the relay user equipment activates its relay functionality, it may start with the relay discovery procedure which involves transmitting relay discovery messages in the radio cell so as to announce its presence as a relay in the radio cell and thus allows the activated relay user equipment to be discovered by other remote user equipments; model A or model B discovery can be performed. Eventually, if the relay is then selected by the remote user equipment to act as a relay, a direct sidelink connection will be established between the relay user equipment and the remote user equipment over which the communication with the radio base station can be relayed.

As discussed above, the relay activation procedure to be performed in the relay user equipment according to the first aspect comprises two checks, the persistence check based on the received persistence check value (threshold) and the relay requirements check. It should be noted that the order in which the two checks are performed is irrelevant to the overall functioning of the first aspect. For instance, the two checks may be performed in parallel, or subsequently, whereas advantageously the second check shall only then be performed when the first (previous) check was successful.

A possible implementation of the persistence check performed in the relay user equipment according to the first aspect will be explained now. The persistence check value was selected by the radio base station from a range of values (e.g., between 0 and 1). Then, the relay user equipment generates a random value in this same range of values. The persistence check value provided by the radio base station can be seen as a threshold with which the generated random value is compared so as to determine whether the persistence check is successful or not. In said respect, one alternative would be to consider the persistence check successful if the generated random value is smaller than or equal to the persistence check value threshold. Alternatively of course, the persistence check could be considered successful if they generated random value is above the persistence check value threshold. In either case, by appropriately selecting the persistence check value (threshold), the radio base station controls the percentage of successful persistence checks performed by all the relay user equipments (that perform this persistence check).

An exemplary variant of the first aspect also considers whether suitable radio resources are available in the relay user equipment(s) so as to perform the relay discovery procedure that follows in case the relay functionality is indeed activated. In particular, the relay user equipment may additionally determine whether such radio resources are already configured and usable to perform the relay discovery procedure. If no suitable radio resources are available to be used by the relay user equipment, a corresponding request to the radio base station can be performed by the relay user equipment, where the radio base station in turn may transmit a response message back, indicating whether and which radio resources are assigned to the relay user equipment so as to perform the relay discovery procedure. On the other hand, in the affirmative case, no such request is necessary. Advantageously, this determination on the available radio resources can be performed after the two checks of the relay activation procedure (i.e., the persistence check and relay requirements check) are finished successfully to thereby avoid to unnecessarily request the radio resources from the radio base station.

According to a further variant of the first aspect, the relay user equipment might still have to seek permission from the radio base station as to whether the relay functionality is allowed to be activated or not; even when the two checks of the relay activation procedure are finished successfully. In other words, after the two checks of the relay activation procedure are finished successfully by the relay user equipment, the relay user equipment shall transmit a relay activation request message to the radio base station so as to request permission from the radio base station to activate the relay functionality. Correspondingly, the radio base station will decide on whether to grant or deny the permission for each of the requesting relay user equipments, and will eventually transmit a corresponding relay activation response message back to the relay user equipment, giving or denying permission to activate the relay functionality in the relay user equipment. Therefore, the activation of the relay functionality in each of the relay user equipment(s) will be ultimately controlled by the radio base station.

In a further improvement of this variant of the first aspect, the requesting of resources for the relay discovery procedure can be combined with the step of seeking permission from the radio base station to activate the relay functionality. In particular, these two steps may be performed at the same time, e.g., by transmitting the relay activation request message which not only shall seek permission to activate the relay functionality but which shall also request radio resources for a possible relay discovery procedure to be performed afterwards. Likewise, the relay activation response message, transmitted from the radio base station, may not only include the permission or denial to activate the relay functionality, but may also include the radio resources to be used for the relay discovery procedure (to be performed in case the relay functionality is indeed activated). Advantageously, the granting of radio resources, i.e., the presence of corresponding information on the granted radio resources in the relay activation response message, can already be interpreted by the receiving relay user equipment as the permission to activate its relay functionality (i.e., denying the permission to activate the relay functionality and at the same time granting radio resources for the relay discovery procedure, is disadvantageous). In a similar manner, although it might be possible to have the request for permission separately from the request of radio resources in the relay activation request message, the request of radio resources for the relay discovery procedure might already be interpreted by the radio base station as the relay user equipment seeking permission to activate its relay functionality.

Further variants of the first aspect distinguish between relay user equipments in connected state and relay user equipments in idle state. The relay user equipment determines in which state it is, and in case it is in the idle state, a transition to the connected state may be performed by the relay user equipment. There may be several reasons why it is advantageous for the relay user equipment to transition to the connected state. One particular reason is that, although relay discovery may be performed also when being in idle state, the activated relay functionality, i.e., serving as a relay for a remote UE, requires the relay user equipment to be in connected state so as to allow the relaying of the communication with the radio base station. Furthermore, when assuming the previous variants where radio resources might have to be first requested from the radio base station and/or where the radio base station has to be sought for permission to activate the relay functionality, the transmission of such request(s) can only be performed by the relay user equipment when being in a connected state (i.e., when having an active connection with the radio base station). It should be noted that the transition to the connected state may involve performing a connection request procedure such that a connection with the radio base station is established. In said respect it may be advantageous to also indicate as the establishment cause that the transition is caused by the relay activation procedure (i.e., the need to request radio resources to perform the relay discovery procedure and/or the need to seek permission from the radio base station to activate the relay functionality).

In further variants of the first aspect, the broadcast message may be extended by including the additional relay requirements that are to be fulfilled by prospective relay user equipments before being allowed to activate their relay functionality. Although the indication that further relays are necessary may be separately provided in the broadcast message from the information on the relay requirements, advantageously, the reception of the broadcast message comprising the additional relay requirements might be implicitly interpreted by the relay user equipment(s) as the indication that further relays are actually necessary in the radio cell and thus as the trigger to start the relay activation procedure in the relay user equipment.

In addition or alternatively, the broadcast message may be extended by including information on radio resources to be used by the relay user equipment for performing the relay discovery procedure after having activated the relay functionality. Again, although the indication that further relays are necessary may be separately provided in the broadcast message from the information on the radio resources to be used for the relay discovery procedure, advantageously, the reception of the broadcast message comprising the information on the radio resources for the relay discovery procedure may be implicitly interpreted by the relay user equipment(s) as the indication that further relays are actually necessary in the radio cell and thus as the trigger to start the relay activation procedure in the relay user equipment.

As discussed above, the relay activation procedure comprises the step performed by the relay user equipment of determining whether the relay user equipment fulfills the additional relay requirements. Exemplarily, the relay requirements that may be one of the following: a minimum and/or maximum threshold for a radio link quality of a link between the relay user equipment and the radio base station, such as the reference signal receive power, RSRP, or the reference signal received quality, RSRQ, a maximum threshold for a movement level of the relay user equipment, and a minimum threshold for a battery level of the relay user equipment.

In one general aspect, the techniques disclosed here feature a method for activating a relay functionality of a relay user equipment within a mobile communication network. The relay user equipment is capable of performing direct communication over a direct sidelink connection respectively with one or more remote user equipments. The relay user equipment is located in a radio cell controlled by a radio base station in the mobile communication network and supports a relay functionality for being capable of serving as a relay, respectively for the one or more remote user equipments, so as to relay communication between the one or more remote user equipments and the radio base station via the direct sidelink connection. The radio base station determines whether or not further relays are necessary in the radio cell. In case it is determined that further relays are necessary in the radio cell, the radio base station selects a persistence check value and transmits a broadcast message in the radio cell. The broadcast message at least indicates that further relays are necessary in the radio cell and comprises the selected persistence check value. Upon receiving the broadcast message, the relay user equipment activates its relay functionality in case the relay user equipment determines that relay requirements for activating its relay functionality in the radio cell are fulfilled by the relay user equipment and in case a persistence check performed by the relay user equipment based on the received persistence check value is successful.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 7 illustrates cell coverage regarding four different states the D2D UE can be associated to;

DETAILED DESCRIPTION

Figure 1:
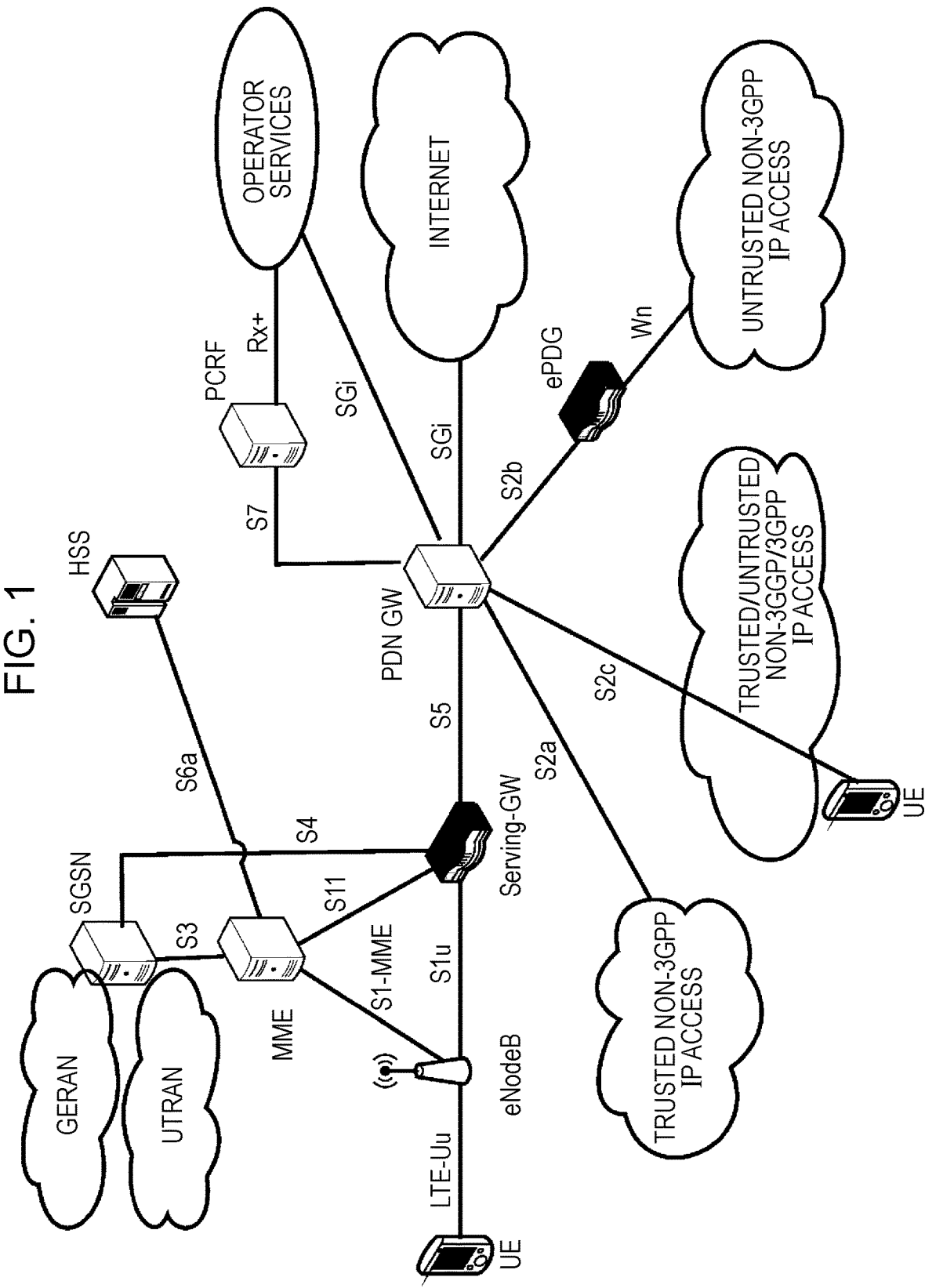
FIG. 1 shows an exemplary architecture of a 3GPP LTE system.
Figure 2:
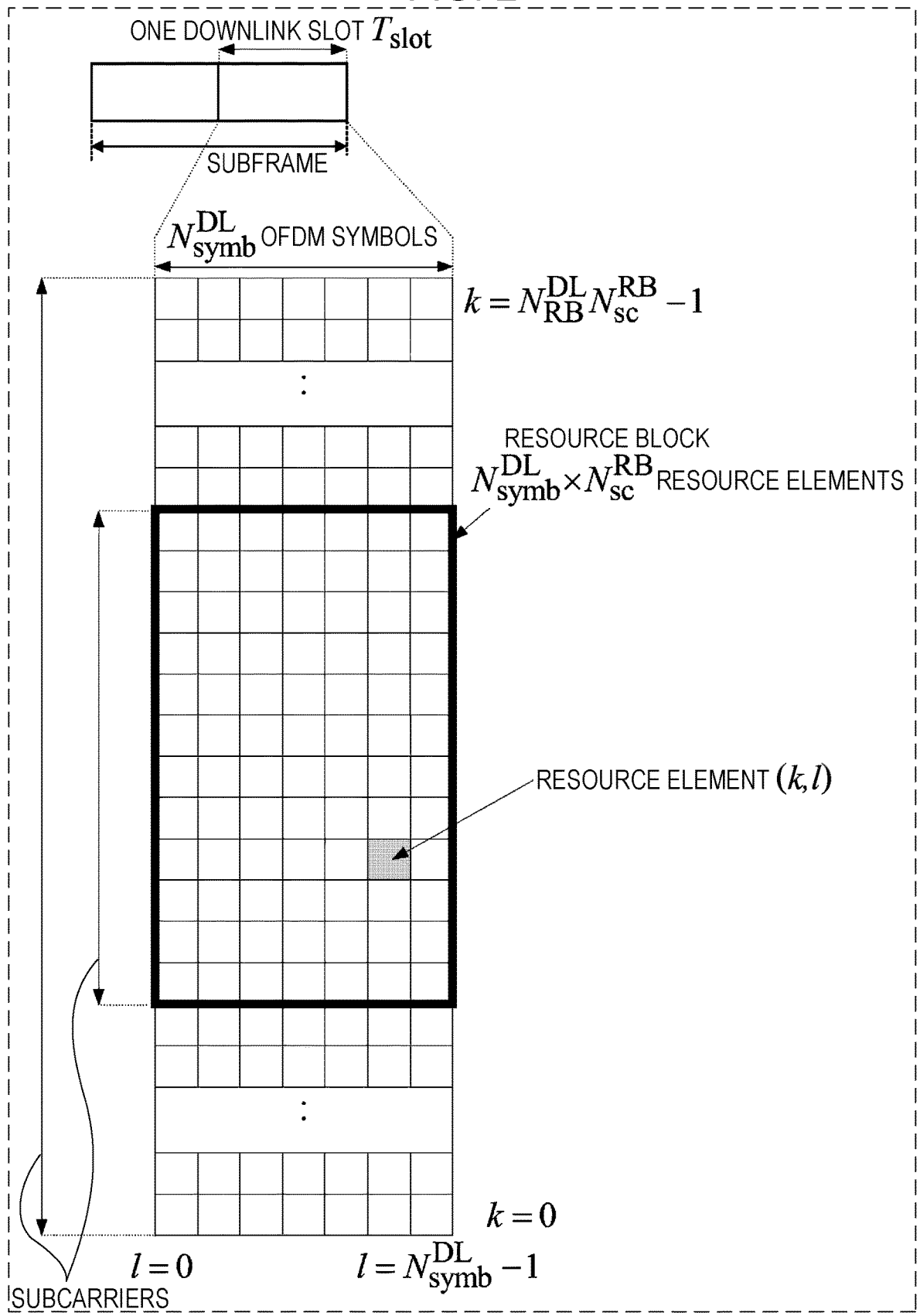
FIG. 2 shows an exemplary downlink resource grid of a downlink slot of a subframe as defined for 3GPP LTE (Release 8/9)
Figure 3:
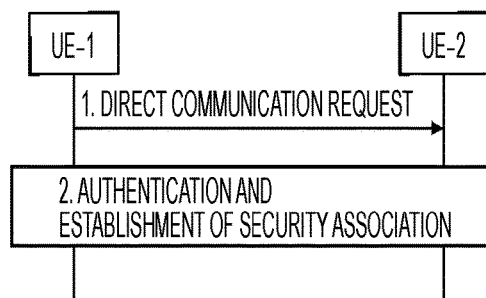
FIG. 3 schematically illustrates how to establish a layer-2 link over the PC5 for ProSe communication.
Figure 4:
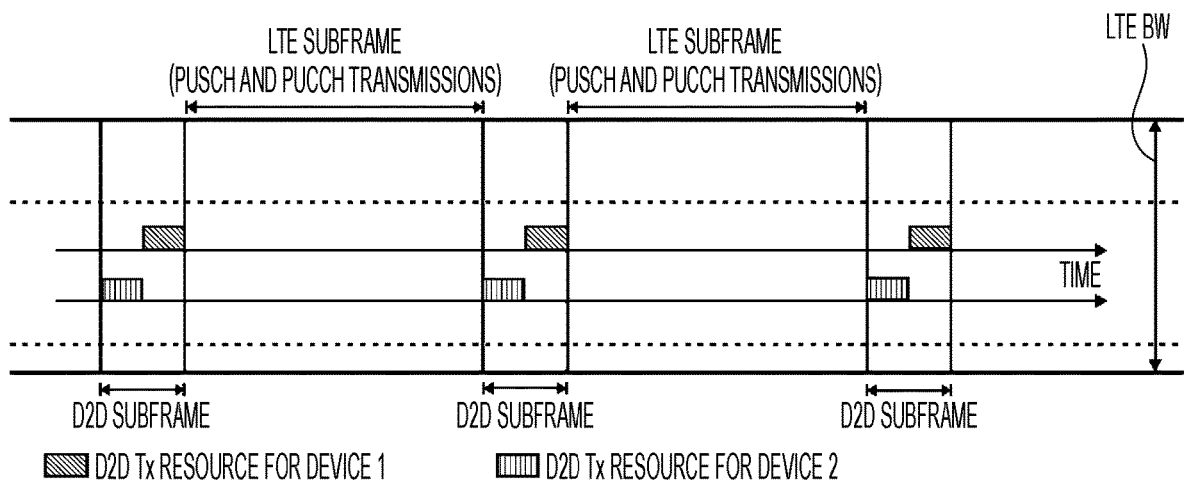
FIG. 4 illustrates the use of transmission/reception resources for overlay (LTE) and underlay (D2D) systems.
Figure 5:
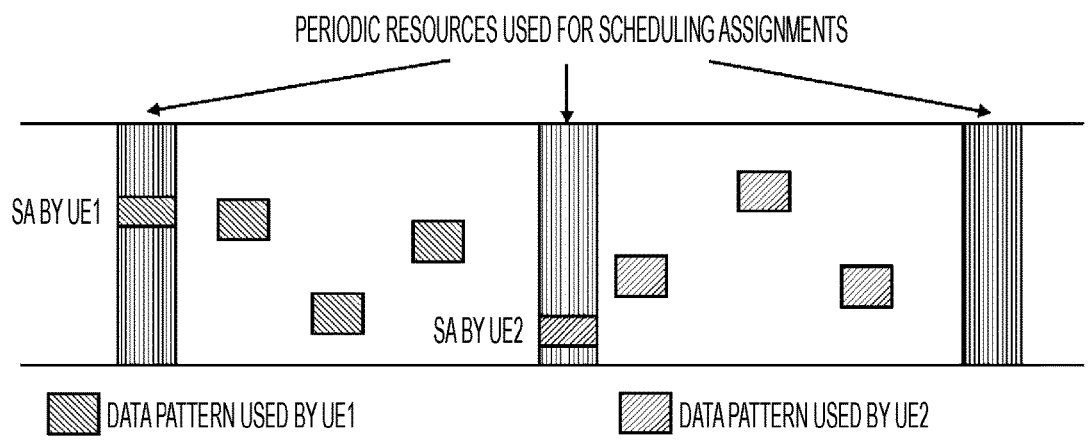
FIG. 5 illustrates the transmission of the Scheduling Assignment and the D2D data for two UEs.
Figure 6:
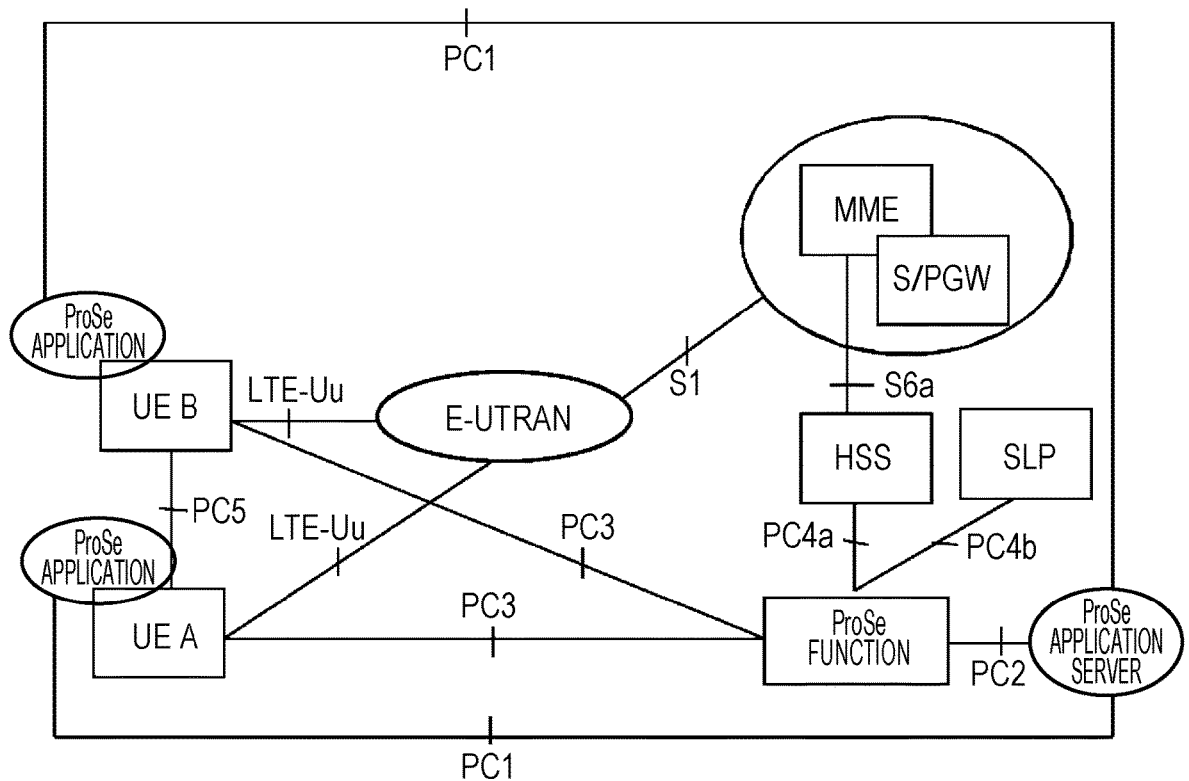
FIG. 6 illustrates an exemplary architecture model for ProSe for a non-roaming scenario.
Figure 7:
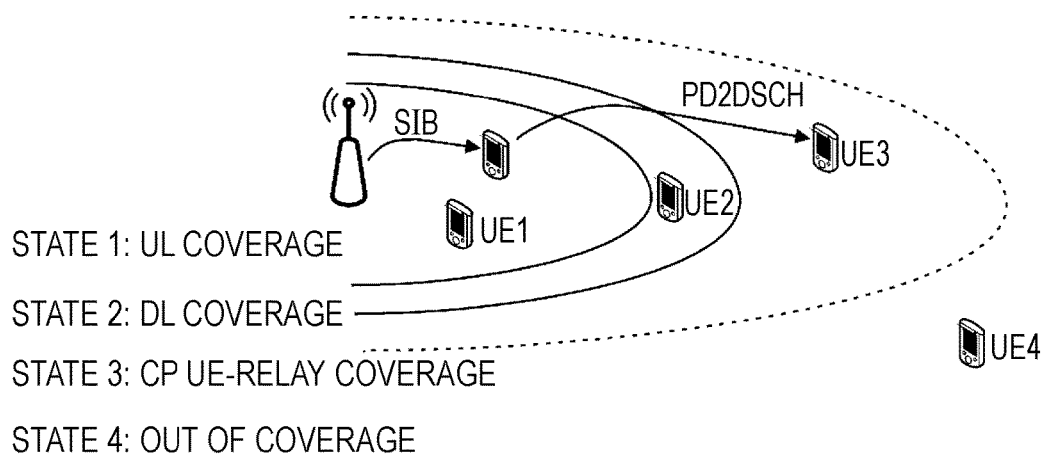
Figure 8:
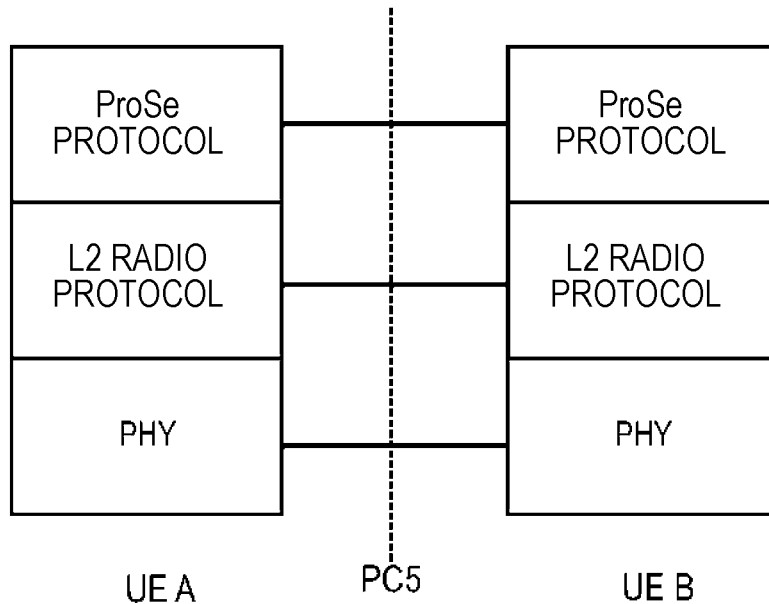
FIG. 8 schematically illustrates a PC5 interface for device-to-device direct discovery.
Figure 9:
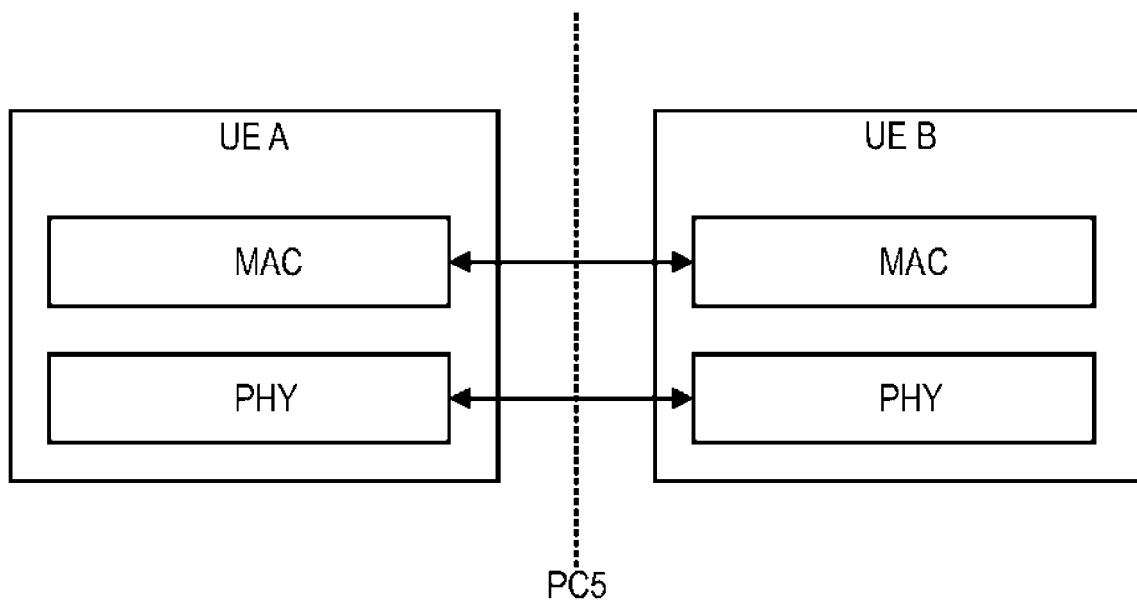
FIG. 9 schematically illustrates a radio protocol stack for ProSe direct discovery.
Figure 10:
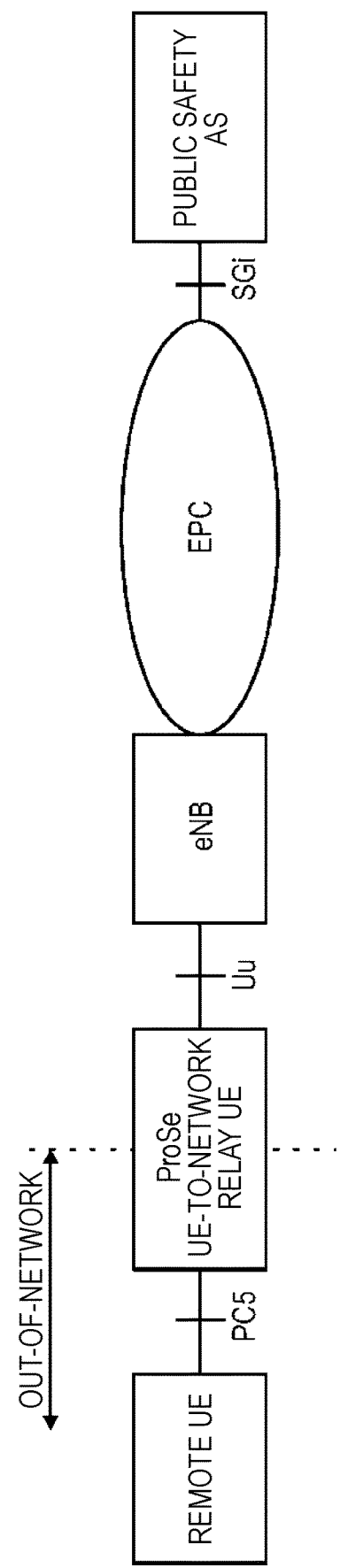
FIG. 10 shows a ProSe UE-to-Network Relay scenario.
Figure 11:
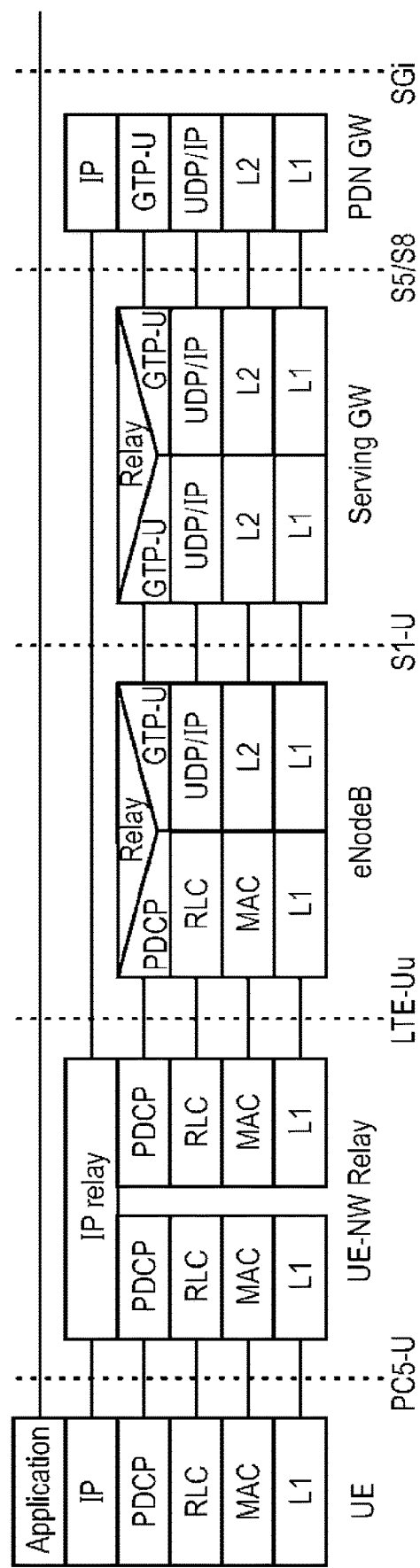
FIG. 11 shows the user plane protocol architecture for the ProSe UE-to-Network relay.
Figure 12:
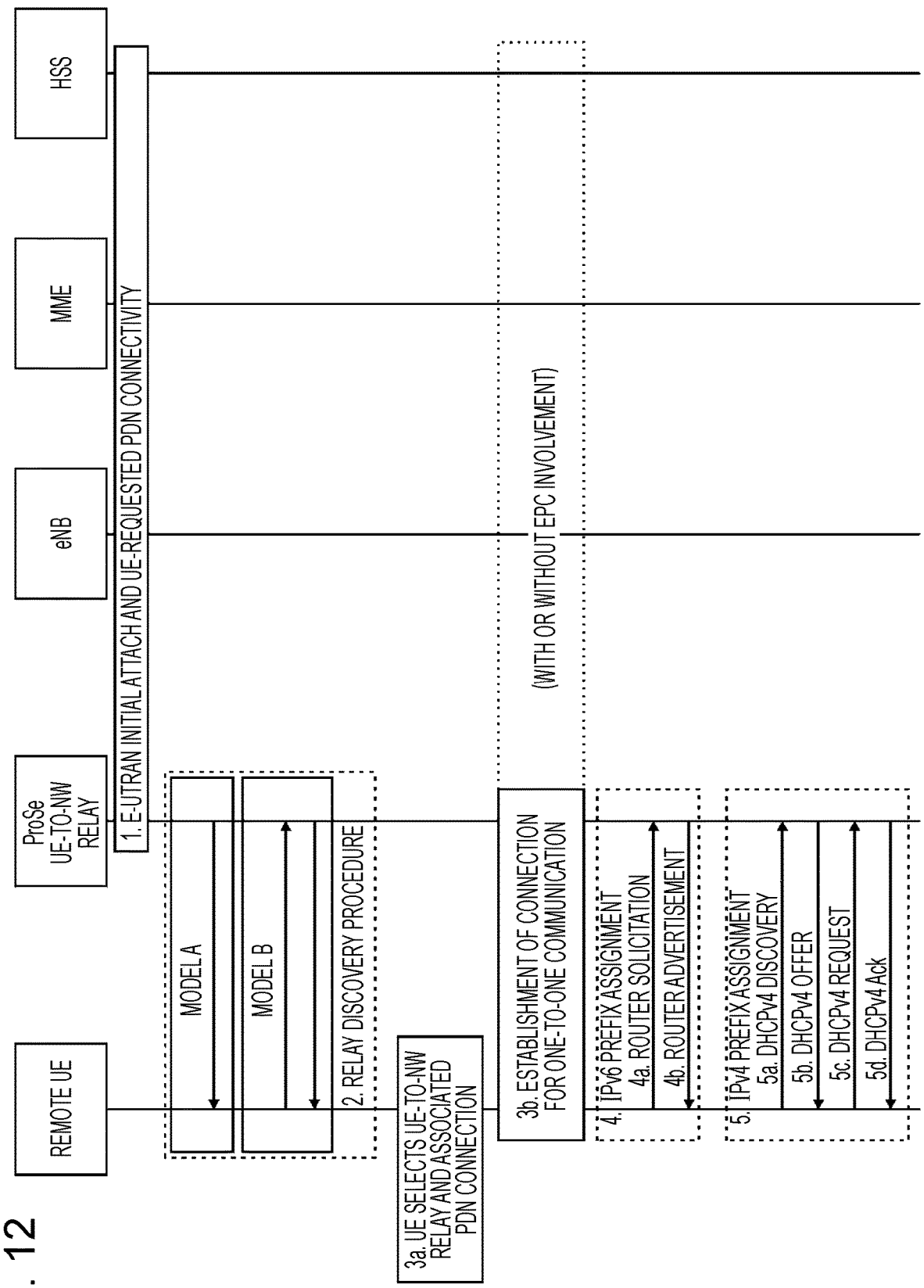
FIG. 12 illustrates the direct communication via ProSe UE-to-Network Relay for relay discovery and one-to-one communication establishment.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

A "relay user equipment" as used in the set of claims and in the application is to be broadly understood as referring to a user equipment which is capable of serving as a relay for another user equipment (termed "remote user equipment"). This also involves the capability of supporting direct communication transmissions directly between two user equipments (see below D2D or ProSe). According to one implementation, the relay user equipment shall support relay functionality as defined for 3GPP LTE-A and as described in the background section. In said connection, the term "remote user equipment" shall merely indicate the role of the user equipment as being the peer of the relay user equipment, i.e., looking for a relay to establish direct communication with.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "relay functionality" as used in the set of claims and in the application is to be broadly understood as the capability of a user equipment to act as a relay. In one exemplary implementation, the relay functionality is the functionality currently being standardized in the 3GPP work item as explained in detail in the background section.

The term "persistence check" as used in the set of claims and in the application is to be broadly understood as a simple determination based on comparing a randomly-generated value against a given threshold to determine whether the persistence check is successful or not. By appropriately selecting the threshold, it is possible to control (roughly) which percentage of the persistence checks will be successful.

3GPP is currently in the process of introducing a relay functionality for the ProSe-capable user equipments. Although some initial agreements have been achieved already (some of which are explained in detail in the background section), no agreements could yet be achieved for some important issues in connection with the ProSe relay functionality. One important issue in said respect is the question of how and when a ProSe relay capable UE will actually start to be a relay UE, i.e., to activate its relay functionality so as to be able to serve as a relay for other ProSe remote UEs. It should be noted that a relay UE with an activated relay functionality will perform a relay discovery procedure so as to allow its discovery for remote UEs in its proximity, which comprises the transmission of relay discovery messages according to model A (periodic) or model B (upon being solicited by a remote UE).

One possible way of controlling the relay activation for relay UEs involves the determination of whether or not the relay-capable UE fulfills particular pre-requisites to act as a relay in a particular radio cell. In more detail, it is assumed that, although a UE is in general capable of acting as a relay, particular (relay) requirements are defined in a radio cell (e.g., by the eNB) which are to be additionally fulfilled before being allowed to act as a relay. For instance, the quality of the link between the relay UE and the eNodeB should be good enough, i.e., higher than a minimum threshold, such that it is guaranteed that the relay capable UEs will be able to serve as a relay relaying additional traffic coming from a remote UE. In another example, also the speed with which a potential relay UE is moving shall be limited to a particular maximum value since it is more likely that a remote UE connected to a fast-moving relay UE will soon get out of the transmission range of the relay UE, thus having to select a new relay. Another possible relay requirement might refer to the battery level of the relay user equipment which should not fall below a certain minimum threshold so as to guarantee service continuity for the remote UE selecting the particular relay UE to establish a connection with the network.

It should be noted however that using relay requirements additionally defined in a radio cell may have the disadvantage that too many (unnecessary) UEs will activate its relay functionality in a radio cell. As mentioned above, the activation of the relay functionality involves the start of the relay discovery procedure which in turn comprises the transmission of relay discovery messages (e.g., in model A, periodically). This might unnecessarily increase the contention and interference in the relay discovery resources and thus in turn may delay the relay selection since the remote UE would need to try on more than one potential relay device to receive connectivity subsequently one after the other until it succeeds in connecting to a relay. Even then, the communication link quality on the PC5 interface will be affected since many relays might be trying to access the same set of resources. Since the Uu quality is bad (that is the reason why the UE is looking for a Relay in the first place), this, combined with a bad PC5 link quality, will bring down the user experience.

Moreover, another possibility to control relay activation would be to use dedicated signaling in said respect. In particular, when the relay-capable UE is interested in serving as a relay, it transmits a corresponding dedicated signaling message to the eNodeB, which then will have the possibility to decide on whether the requesting relay UE shall be activated as a relay or not. A corresponding response message can then be sent back to the relay UE so as to give or deny permission to activate the relay functionality. Although the exchange of dedicated signaling with the eNodeB has the advantage that the eNodeB can explicitly control the number of relay UEs with activated relay functionality, this also entails some disadvantages. For instance, the use of dedicated signaling is not possible for relay-capable UEs that are in an idle state, since the dedicated signaling may only be transmitted to the eNB when being in a connected state i.e., having an active connection with the eNodeB over which the dedicated signaling message is transmitted. Consequently, idle-state UEs will have to transition to the connected state, even if later on they will not be permitted to activate their relay functionality, thereby wasting resources and battery. Furthermore, this approach leaves open when exactly the relay capable UEs shall transmit the dedicated signaling to the eNodeB so as to request serving as a relay. For example, transmitting dedicated signaling messages to the eNodeB might increase the load at the eNodeB and might congest the Uu link unnecessarily, particularly if many relay-capable UEs are available in the radio cell and repeatedly will seek the eNodeB for permission to activate the relay functionality. Additionally, an Idle-state UE transitioning to Connected-state to seek permission will need to stay in Connected-state until the RRC connection is explicitly released by the eNB by, e.g., sending a Connection Release message. Further, staying in Connected-state in the hope of serving as a relay for a remote UE may lead the relay UE to wait for a long time before a remote UE actually selects the relay UE to serve as relay. It would be better that the relay UE had an opportunity to act as Relay while being in Idle Mode itself.

Another possible solution for the relay activation would be combining both approaches mentioned above, namely to check additional relay requirements and use dedicated signaling for getting the permission from the eNB. However, also in this combined approach there may be too many (unnecessary) requests transmitted to the eNB thereby congesting the Uu link as well as increasing the processing load in the eNB. Furthermore, also in this combined approach, idle-state UEs might establish the RRC connection unnecessarily (i.e., transition to connected state) when they are later denied by the eNodeB to activate their relay functionality in case no further relay(s) are actually needed. Moreover, this combination approach does not specify at which time(s) the dedicated signaling request should be transmitted to the eNodeB; repeatedly as long as the relay requirements are fulfilled.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

Furthermore, as mentioned above, the following embodiments may be implemented in the 3GPP LTE-A (Rel.12/13) environment. The various embodiments mainly provide a mechanism for a relay activation procedure performed by relay UEs, such that other functionality (i.e., functionality not changed by the various embodiments) may remain exactly the same as explained in the background section or may be changed without any consequences to the various embodiments. This is true for instance for the relay discovery procedure started after the relay functionality is activated, as well as for the exact procedures so as to establish the direct sidelink connection over which they relay is taking place, as well as for the exact procedure of how data is relayed between the remote user equipment and the relay user equipment, etc.

A scenario may be assumed where user equipments are enabled to perform ProSe communication (ProSe-enabled UEs), i.e., direct D2D transmissions directly between UEs without the detour via the eNodeB. Furthermore, at least one of these (ProSe-enabled) UEs in the scenario shall support relay functionality as explained, e.g., in the background section for the specific implementation in Release 13 of the 3GPP standard(s). In other words, this relay UE (which is located in a radio cell and connected to the corresponding radio base station controlling the radio cell) shall be capable of serving as a relay to other (ProSe-enabled) UEs (remote UEs) thereby allowing these remote UEs to connect, via the relay, to the eNB.

First Embodiment

In the following a first embodiment for solving the above problem(s) will be described in detail. Different implementations of the first embodiment will be explained in detail below. According to the first embodiment, the activation of the relay functionality in a relay-capable UE is improved.

Figure 13:
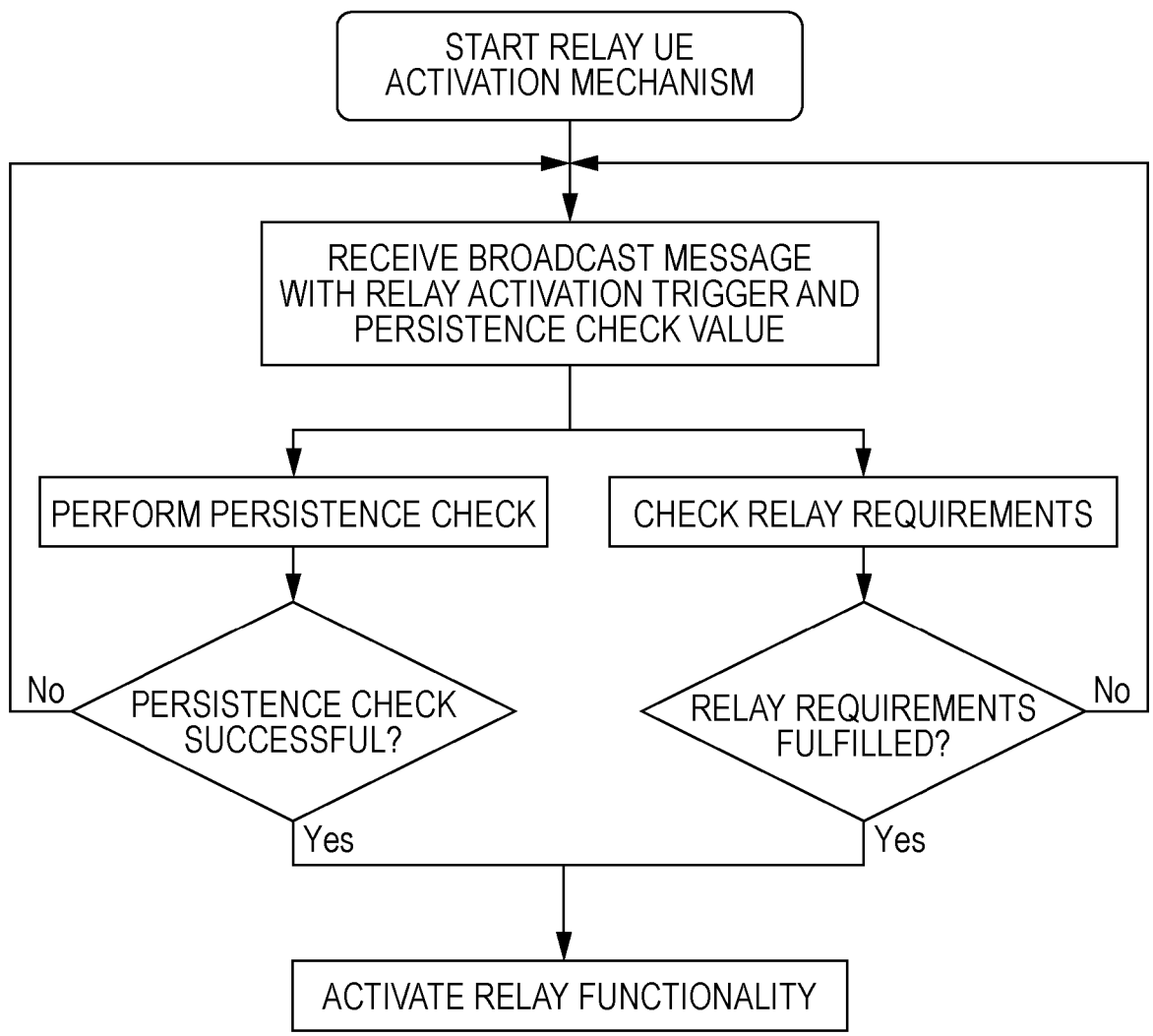
FIG. 13 is an alternative sequence diagram for the relay UE behavior according to exemplary implementations of the first embodiment.

A general implementation of the first aspect will be explained in connection with the sequence diagram of FIG. 13 illustrating the relay UE behavior for the relay activation procedure to be performed in the relay UE so as to determine whether or not to activate the relay functionality.

The eNodeB is in control of when the relay-capable UEs in its radio cell shall start the respective relay activation procedure and thus can avoid unnecessary relay activations in its radio cell. In said respect, the eNodeB shall trigger the relay activation procedure(s) mainly when there is a need in the radio cell for one or more additional relays. On the other hand, if there is no need in the radio cell for more relays, the eNodeB will not trigger the relay UEs in its radio cell to start the relay activation procedure. For said purpose, the eNodeB, when determining that further relays are necessary, will transmit a suitable broadcast message in its radio cell preferably to be received by all in-coverage relay-capable UEs (e.g., also those UEs that are at the outer edges of the coverage area of the eNodeB to thereby substantially extend the coverage area by activating the relay functionality). This broadcast message shall include or be interpreted by the receiving relay UEs as a trigger to start the relay activation procedure. For instance, the broadcast message may include an explicit relay trigger, e.g., a one-bit flag.

Furthermore, the eNB will select a suitable persistence check value (threshold), where the particular value is selected, e.g., depending on the number of relays that are needed in the radio cell. By use of the persistence check in the relay activation procedure, performed in the respective relay UEs (to be described later in detail), the eNodeB has control on the number of relay UEs that might eventually activate the relay functionality. This persistence check value is also included in the broadcast message broadcast in the radio cell by the eNodeB. Advantageously, instead of providing a separate indication in the broadcast message that further relays are necessary (i.e., the separate indication triggering the start of the relay activation procedure in the relay UE), the presence of the persistence check value in the broadcast message may be already implicitly regarded as this indication that further relays are necessary.

Correspondingly, from the perspective of one of these relay-capable UEs in the radio cell (i.e., see FIG. 13), the corresponding broadcast message with the relay activation trigger (to start performing the relay activation procedure) and the persistence check value will be received. The reception of the broadcast message will trigger the relay activation procedure in the relay UE, which comprises the following tests so as to determine whether the relay functionality shall indeed be activated or not.

The first check was already mentioned before, namely the persistence check performed by the relay UE based on the received persistence check value in the broadcast message. The persistence check is to be performed by the relay UE, and only when it is successful, the activation of the relay functionality shall be possible. If not successful, the relay UE may terminate the relay activation procedure and can continue to monitor for another broadcast message that newly triggers the relay activation procedure in the relay UE.

Another check to be performed during the relay activation procedure by the relay UE is whether or not additional relay requirements, defined as a pre-requisite within the radio cell to act as a relay, are fulfilled by the relay UE. Again, only when the additional relay requirements are fulfilled, the activation of the relay functionality shall be possible. If the relay requirements are not fulfilled, the relay UE may terminate the relay activation procedure and can monitor for another broadcast message that newly triggers the relay activation procedure in the relay UE.

As apparent from FIG. 13, when both checks are successfully finished by the relay UE, the relay UE may activate its relay functionality and thus start with the relay discovery procedure to announce its presence in the cell. The relay discovery procedure may be performed by the relay UE for instance according to model A or model B, as explained in the background section. Correspondingly, the activated relay UE may be discovered and selected by a remote UE that needs to maintain or start a connection via the relay to the eNodeB. Further details on subsequent procedures to be performed after activating the relay functionality, such as the mentioned relay discovery procedure, the relay select procedure and the relaying procedure as such, are omitted herewith; instead reference is made to the background section as possible exemplary implementations of these procedures.

The relay activation according to the just explained first embodiment comprises that the eNodeB specifically determines when relays are indeed necessary to then correspondingly transmit the broadcast message. This allows triggering the relay activation procedures in the relay UEs only when it is indeed necessary. Consequently, the improved relay activation of the first embodiment thereby avoids that relay activation procedures are started in the relay UEs unnecessarily, which saves processing on the relay UE side. Furthermore, by implementing a persistence check in the relay activation of the first embodiment, an additional level of control is provided for the eNodeB to limit the number of relay UEs (among all relay UEs in the radio cell that start the relay activation procedure; i.e., preferably those that have not yet activated its relay functionality) that will activate the relay functionality. Correspondingly, only (more or less) the necessary number of additional relays will be activated, such that the relay discovery resources (then used by the relay UEs after its activation) will not be congested with unnecessary relay discovery messages. This particular approach of relay activation according to the first embodiment also refrains from including an additional request for permission with the eNodeB thereby avoiding additional messages to be transmitted over the Uu link to the responsible eNodeB. Correspondingly, the load at the eNodeB will not be increased and congestion of the Uu link is avoided, while at the same time allowing the eNodeB to have control on (at least) the number of relay UEs that will eventually activate the relay functionality.

In the following, further different and alternative implementations of the first embodiment will be explained.

As explained for the implementation of the first embodiment according to FIG. 13 (and which will also be part of the remaining implementations according to the remaining figures), the relay UE will determine whether it fulfills particular relay requirements defined in the radio cell. These particular relay requirements may be defined, e.g., by the eNodeB, or another responsible entity in the core network, such as MME or by the ProSe function itself. In this case, corresponding information on the particular relay requirements may be broadcast in the radio cell by the eNodeB, for instance in a suitable system information block (SIB). Alternatively, the requirements can be hardcoded in the UE, or preconfigured by the operator, e.g., in USIM or configured by higher layer signaling including NAS (non-access stratum) signaling or provided by the eNB in a dedicated signaling message to the relay UE when the relay UE was previously in the Connected-state.

The particular relay requirements may be different from radio cell to radio cell, and can be more or less stringent depending on the current situation. Some possible relay requirements will be presented in the following, which can be employed separately or in combination. However, these parameters should not be regarded as being mandatory to be used as relay requirements but shall be regarded as examples. For instance, the quality of the radio link between the relay UE and the eNodeB (i.e., the Uu link) should not fall below a particular limit in order to ensure efficient relaying/forwarding by the relay UE. On the other hand, the Uu link quality could additionally be required to stay below a predetermined threshold when considering that relay UEs with a too good Uu quality might likely be far away from the cell edge or from coverage holes such that it might not be as interesting for the radio cell for such relay UEs to act as relays. Another possible relay requirement to be fulfilled by prospective relay UEs might relate to the mobility of a relay UE. For instance, relay UEs moving at high speed are more likely to get out of the reach of the remote UEs, thus forcing these remote UEs to select another relay UE. Correspondingly, an upper limit for the mobility/speed of the relay UE might be defined as a relay requirement to be fulfilled by any relay UE that wants to act as a relay in the radio cell. A further possible relay requirement refers to the battery level of the relay UE which preferably should be above a minimum threshold so as to ensure that the relay UE is able to perform as a relay for a sufficiently long time. For instance, if a relay UE with a limited remaining battery is selected as a relay, the packet forwarding for the remote UEs could quickly drain its battery power. This is detrimental not only for the remote UEs, which have to select a new relay, but also for the relay UE's normal operation which is terminated earlier.

Other relay requirements may for instance refer to an overload situation in the relay UE, which will prevent or seriously inhibit the relay UE to serve as a relay for a remote UE. The functional definition of "preventing or seriously inhibiting the relay to serve as a relay" shall not be interpreted narrowly in that it is impossible for a relay user equipment to serve as a relay for a further single remote user equipment. Rather, an overload situation may be defined flexibly for a relay user equipment, for instance by defining particular limits at which it is understood that an efficient operation of the relay user equipment is ensured. The overload might refer to any of the hardware or software components of the relay user equipment, such as the processor, memory, ports, logical channel IDs, available bandwidths in uplink/downlink, etc. The overload is characterized as being temporary since it may rapidly change.

Correspondingly, a set of one or more of these or other relay requirements might need to be checked by any relay UE during the relay activation procedure of the implementation of the first embodiment.

Figure 14:
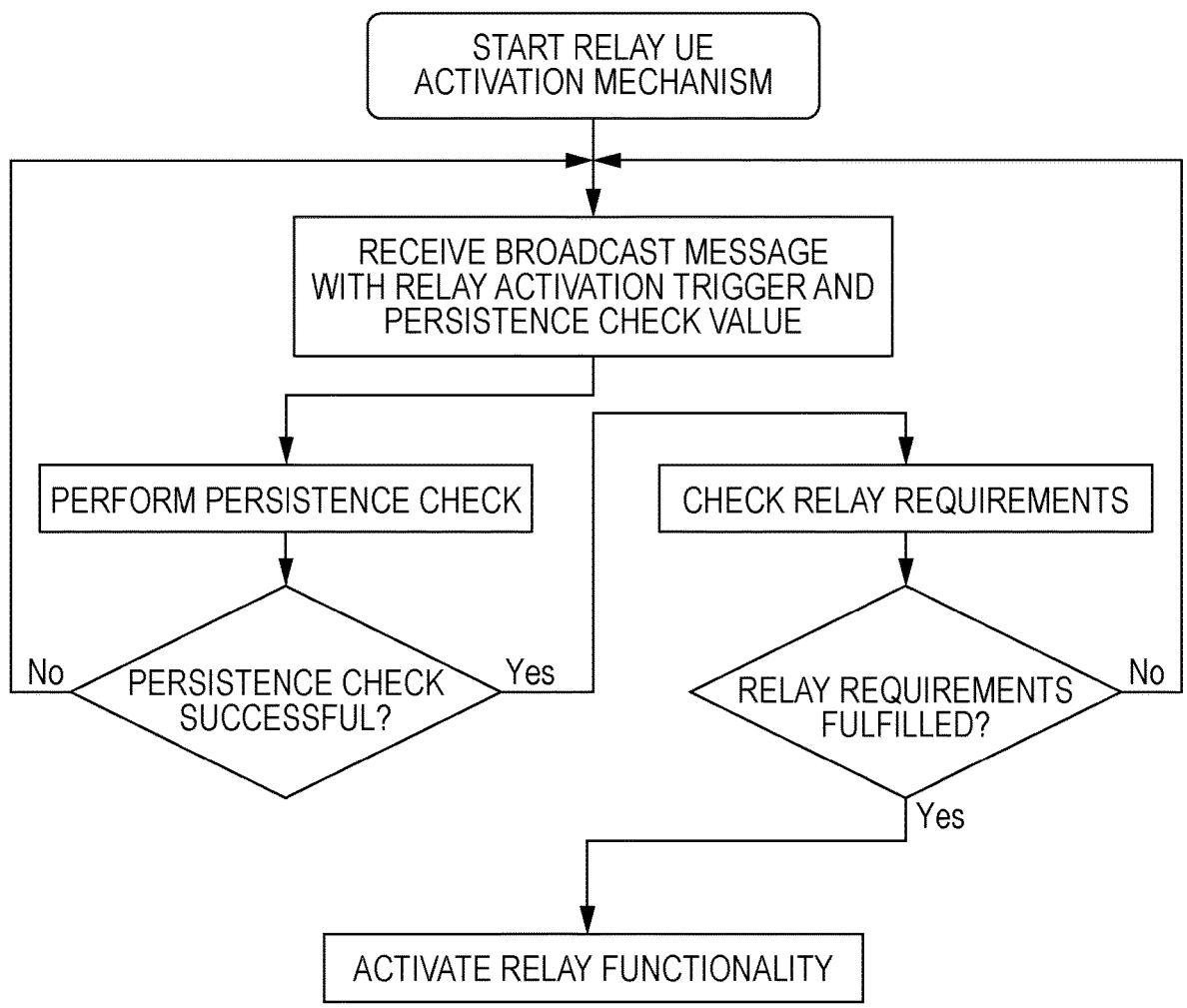
FIG. 14 is an alternative sequence diagram for the relay UE behavior according to exemplary implementations of the first embodiment.

For the specific implementation of FIG. 13, it was assumed that the two checks are performed basically in parallel. However, FIG. 14 illustrates a different implementation of the first embodiment, where these two determinations are performed subsequently, the particular order being irrelevant for the functioning of the present disclosure. In the exemplary implementation of FIG. 14 the simple persistence check is performed first, and only in case this persistence check is successful, the relay UE then continues to check whether the relay requirements are fulfilled or not. Consequently, if already the persistence check fails, the relay activation procedure may be stopped immediately since there is no need to further check whether the relay requirements are fulfilled, which saves processing at the relay UE.

Similarly, although not illustrated in the figures, the relay UE may first check whether the relay requirements are fulfilled, and, only in case the relay requirements are fulfilled, may continue to perform the persistence check. Thus, if already the relay requirements check fails, the relay activation procedure may be terminated since there is no need to further perform the persistence check, which saves processing at the relay UE.

Moreover, as was described above, the relay UE performs a persistence check during the relay activation procedure based on the persistence check value provided by the eNodeB in the broadcast message. The persistence check value, which can be seen as a threshold to which a subsequently generated random value will be compared to pass or not pass the persistence check, is determined in the eNodeB, e.g., based on the number of relay UEs which the eNodeB wants to have activated. In one implementation, the eNodeB can decide on the number of relay UEs that are required in the cell based on many factors including a feedback from the ProSe function which the eNB can receive through proprietary interface(s) or through core network elements like MME, or purely based on OAM (Network Operations and Management) configuration from the network, e.g., stating that certain number of relays are required every square kilometer, or purely based on its own deduction from the number of UEs running public safety services in the cell (which in turn is clear from the CQI classes of the bearers being served by the eNB) and/or some statistical calculation on how many relay UEs are generally required per certain number of UEs running public safety services; or, the eNodeB determination on the number of relay UEs that are required in the cell could purely be based on the UEs reporting their requirement(s) for relay service. Another example could be that the UE reporting their requirement for relay service could be based on the in-coverage public safety UEs experiencing bad radio quality (on Uu interface) and the eNodeB extrapolating this figure to include a possible number of out of coverage UEs.

Persistence checks are already used in the prior art, 3GPP, standards, although for other purposes. For instance, technical standard TS 25.321, current version v12.2.0, defines a persistence value Pi, which is used so as to control the instant of time when a UE is allowed to access the RACH channel when, e.g., a previous transmission was not deemed successful. By spreading the access in the time domain, the number of UEs that access the RNC at any given time is tightly controlled by the RNC by adjusting the value of persistence value Pi.

According to variants of the first embodiment, the persistence check may be performed in a similar manner. Thus, a range of values (e.g., between 0 and 1) is defined within which the persistence check value is selected by the eNodeB. Correspondingly, the relay UE(s) will generate during the relay activation procedure a random value within this same range of values. In order to pass the persistence check, the randomly generated value of the relay UE will be compared to the persistence check value selected by the eNodeB. One possibility is to define that the persistence check is successful, in case the randomly generated value is smaller than or equal to the persistence check value provided by the eNodeB; or vice versa in case the randomly generated value is larger than the persistence check value provided by the eNodeB. For instance, by selecting a suitable persistence check threshold, the eNodeB can control the percentage of persistence checks that will be successful or not. When assuming that the persistence check is successful when the randomly generated value is smaller than or equal to the persistence check value, the eNodeB may limit the successful persistence checks to a low percentage by setting the persistence check threshold to a low value, e.g., 0.1; correspondingly, setting the persistence check threshold to a middle value, such as 0.5, will allow the eNodeB to control that only about half of the persistence checks are successful. Correspondingly, the persistence check provides a simple and effective mechanism to leave the eNodeB some control on the number of relay UEs that will/can activate its relay functionality, without having to force the relay UEs to directly seek permission from the eNodeB via dedicated signaling.

Figure 15:
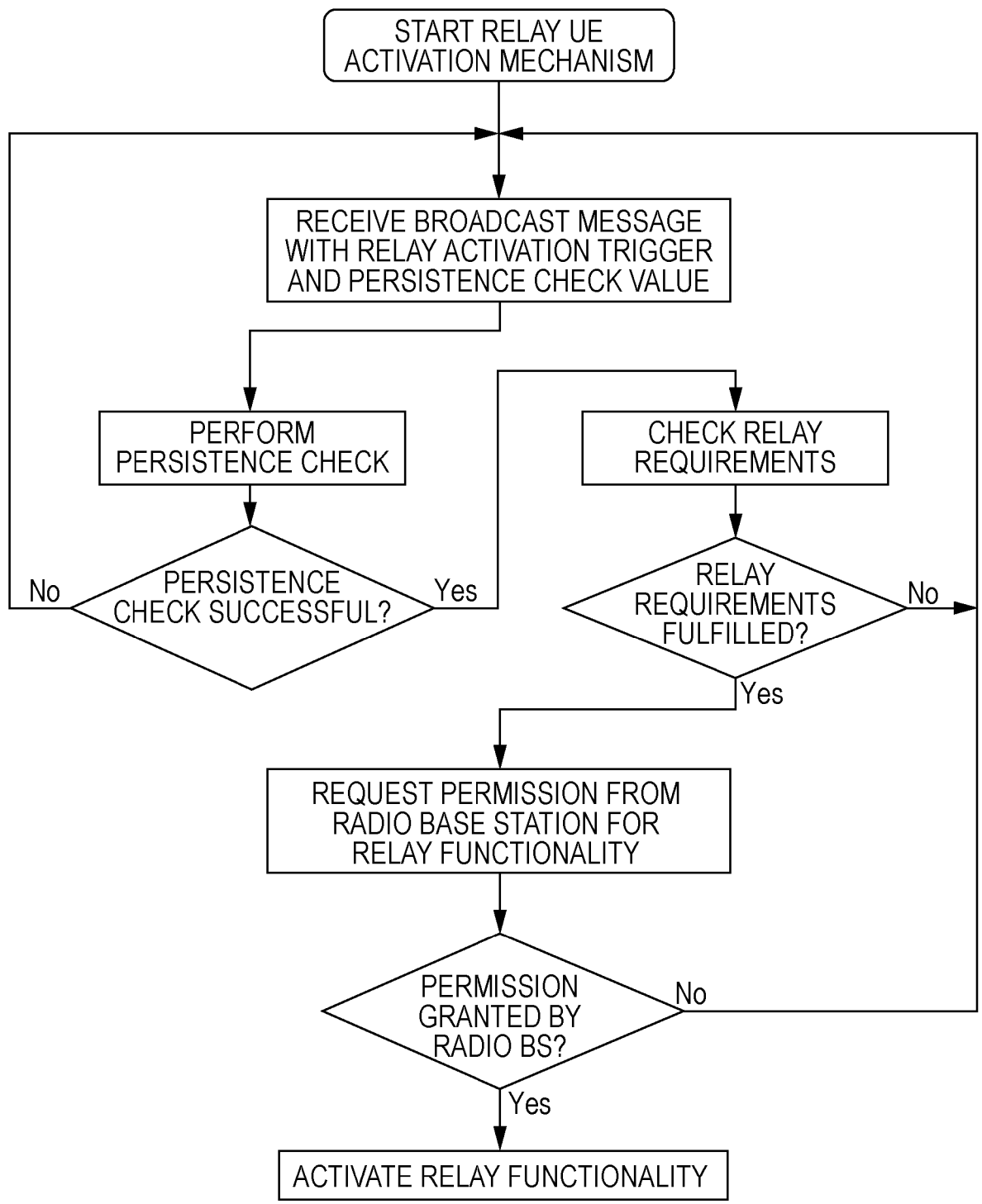
FIG. 15 is a sequence diagram for the relay UE behavior according to a further implementation of the first embodiment where the relay UE additionally needs to seek permission from the radio base station to activate the relay functionality.

Nevertheless, although the previous implementations of the first embodiment do not have to have a dedicated request for permission from the eNodeB, an alternative implementation of the first embodiment includes such an additional level of control. In particular, the sequence diagram of FIG. 15 illustrates such an exemplary implementation, based on the previously discussed implementation of FIG. 14. In addition to the persistence check and relay requirement check, the relay activation procedure, according to this alternative implementation of the first embodiment illustrated in FIG. 15, additionally comprises that the relay UE requests permission from the eNodeB as to whether it is allowed to activate its relay functionality or not. This additional request for permission can be for example performed after successfully concluding both checks of the relay activation procedure, as assumed for the implementation illustrated in FIG. 15. Consequently, the eNodeB will then have the opportunity to specifically deny or a grant the permission for each of the requesting relay user equipments one by one. For instance, this would be advantageous in scenarios where the eNodeB does not exactly know how many relay-capable UEs are in its radio cell but where the eNodeB still wants to ensure that the number of UEs with an activated relay functionality stays below a particular limit.

Correspondingly, after transmitting a corresponding message (e.g., termed relay activation request message) to the radio base station, the relay UE will await and eventually receive a corresponding response message (e.g., termed relay activation response message) which includes the response from the radio base station, i.e., whether or not the relay UE is allowed to activate its relay functionality. Following the content of this response message, the relay UE will thus activate or not activate its relay functionality. In one implementation, both the request and response message can either be designed as an RRC message (e.g., SidelinkUEInformation of 3GPP TS 36.331, for details see later) or as a MAC CE (Control Element) with a specified LCID (Logical Channel Identify) each for the request and response message.

This relay activation request message may not only carry the request for permission to activate the relay functionality of the relay UE (and the request for radio resources, see implementations of the first embodiment described later), but may also comprise further information as will be explained in the following.

For instance, the message may indicate that the purpose of seeking permission is to act as a relay.

Furthermore, this relay activation request message transmitted from the relay UE to the eNodeB may comprise information on the one or more services that may be provided by the relay UE to remote user equipments. For instance, the services may be public safety services or non-public safety services. In any case, by providing such information on the offered services, the eNodeB may determine a priority associated with the respective one or more offered services and may thus base its decision of whether to permit or not permit the relay UE to activate its relay functionality based on such information. As an example, the potential relay UE may indicate its intention to serve Medical Emergency Personnel for Voice-specific call in a flat layout, and the eNB already that received and approved 5 such relays already knows that more relays cannot be accommodated (without creating interference) in the cell and that the 5 relays are already sufficient based on its knowledge, e.g., from Proximity services, such that the eNodeB rejects the new request(s) to become a relay.

Similarly, the relay UE may include group identification information on the one or more services that may be provided by the relay UE to remote user equipments. This group identification information allows identifying the group to which each of the one or more offered services belongs to.

According to a particular implementation in the 3GPP standard environment of Release 12, 13, the SidelinkUEInformation message (already defined in the technical standard TS 36.331, current version 12.6.0, clause 6.2.2 incorporated herein by reference) can be reused in said respect. Correspondingly, this SidelinkUEInformation message can be extended with additional information element(s) to be able to indicate some additional information as explained above, e.g.:

the purpose of seeking permission is to act as a relay that the request for resources refers to resources for the relay discovered procedure and not for, e.g., commercial discovery procedure or even the Release-12 direct (D2D) communication between two ProSe UEs; thus, a corresponding additional information element would allow to simultaneously request resources for the relay discovery procedure as well as for the Release 12 direct discovery procedure and/or Release 12 D2D communication.

A corresponding example of an extended definition of the SidelinkUEInformation message is given below.
SidelinkUEInformation Message

```
-- ASN1START
SidelinkUEInformation-r12 ::=      SEQUENCE {
    criticalExtensions             CHOICE {
        c1                         CHOICE {
            sidelinkUEInformation-r12
SidelinkUEInformation-r12-IEs,
            spare3 NULL, spare2 NULL, spare1 NULL
        }
        criticalExtensionsFuture   SEQUENCE { }
    }
}
```

RequestPurpose-r13-IEs::=BOOLEAN,

```
SidelinkUEInformation-r-12-IEs ::= SEQUENCE {
    commRxInterestedFreq-r12       ARECN-ValueEUTRA-r9
    OPTIONAL,
    commTxResourceReq-r12          SL-CommTxResourceReq-
r12                                ENUMERATED {true}
    OPTIONAL,
    discRxInterest-r12
    OPTIONAL,
    discTxResourceReq-r12          INTEGER {1..63}
    OPTIONAL,
    lateNonCriticalExtension       OCTET STRING
    OPTIONAL,
    nonCriticalExtension           SEQUENCE { }
```

```
    OPTIONAL
}
SL-CommTxResourceReq-r12 ::= SEQUENCE {
    carrierFreq-r12                ARECN-ValueEUTRA-r9
    OPTIONAL,
    destinationInfoList-r12        SL-DestinationInfoList-r12
}
SL-DestinationInfoList-r12 ::=     SEQUENCE (SIZE {1..maxSL-
Dest-r12}} OF SL-DestinationIdentity-r12
SL-DestinationIdentity-r12 :       BIT STRING {SIZE {24} }
--ASN1STOP
```

| SidelinkUEInformation field descriptions |
|---|
| commRxInterestedFreq<br>Indicates the frequency on which the UE is interested to receive sidelink direct communication.<br>commTxResourceReq<br>Indicates the frequency on which the UE is interested to transmit sidelink direct communication as well as the sidelink direct communication transmission destination(s) for which the UE requests E-UTRAN to assign dedicated resources.<br>destinationinfoList<br>Indicates the destination which is identified by the ProSe Layer-2 Group ID as specified in TS 23.303 [68].<br>discRXinterest<br>Indicates that the UE is interested to monitor sidelink direct discovery announcements.<br>discTXResourceReq<br>Indicates the number of resources the UE requires every discovery period for transmitting sidelink direct discovery announcement. It concerns the number of separate discovery message(s) the UE wants to transmit every discovery period.<br>Request Purpose<br>Could have two values: Add (true) or New (false).<br>"Add" indicates if the UE needs to support (receive and/or transmit) SL for both Rel. 12 and Rel. 13 (Relay Discovery) purpose simultaneously and therefore, the new request is on top of the resources that it already has been configured with and which it intends to continue to use.<br>"New" indicates that the request is only to grant resources requested in this message. |

According to further implementations of the first embodiment, the relay activation procedure will also take into account whether radio resources are already available for performing the relay discovery procedure (which is started subsequent to activating the relay functionality). In said connection, it should be noted that in the standardization no final agreement has yet been achieved on when and how the radio resources to be used for relay discovery are defined and provided to the relay UE(s). One possible implementation is to broadcast a suitable relay discovery resource pool, providing radio resources that are to be used in connection with the relay discovery procedure to be performed by the relay UE. In turn, specific radio resources may then be either autonomously selected by the relay UE from such a suitable relay discovery resource pool, or the specific radio resources (from within this relay discovery resource pool) have to be scheduled by the eNodeB (upon being requested by the relay UE). The relay UEs in the radio cell may be configured to either be allowed to autonomously select radio resources from such a pool or may need to request dedicated radio resources from the eNodeB first. In any case, the relay UE will determine whether or not radio resources are already configured and available to be used by the relay UE for the relay discovery procedure to be performed upon activating its relay functionality. Then, in case suitable radio resources are indeed available to the relay UE, the relay UE may continue with the relay activation procedure (e.g., activate the relay functionality). On the other hand, in case no suitable radio resources are available to the relay UE for the relay discovery procedure, the relay UE may request such radio resources from the radio base station, and the radio base station will correspondingly receive and respond by assigning suitable radio resources for the relay discovery. Upon being assigned suitable radio resources, the relay UE may continue with the relay activation procedure (e.g., activate the relay functionality).

As mentioned above, one possible implementation of how to request radio resources is the use of the SidelinkUEInformation message. The relay UE may signal within this message that resources are requested for the relay discovery procedure. Furthermore, the SidelinkUEInformation message shall be extended by an information element to request resources for relay discovery procedure such that within the same SidelinkUEInformation message the relay UE may additionally request resources for commercial discovery and/or for Rel.12 D2D communication. A possible exemplary implementation of the SidelinkUEInformation message is provided below.

SidelinkUEInformation Message

```
-- ASN1START
SidelinkUEInformation-r12 ::=      SEQUENCE {
    criticalExtensions             CHOICE {
        c1                         CHOICE {
            sidelinkUEInformation-r12
sidelinkUEInformation-r12-IEs
            spare3 NULL, spare2 NULL, spare1 NULL
        }
        criticalExtensionsFuture   SEQUENCE { }
    }
}
```

SidelinkUEInformationList-r13-IEs::=SEQUENCE (SIZE (1 . . . mxSL-purpose)) OF SL-DestinationIdentity-r12,

```
SidelinkUEInformation-r-12-IEs ::= SEQUENCE {
    commRxInterestedFreq-r12        ARFCN-ValueEUTRA-r9
OPTIONAL,
    commTxResourceReq-r12           SL-CommTxResourceReq-
r12
OPTIONAL,
    discRxInterest-r12              ENUMERATED
{true}
OPTIONAL,
    discTxResourceReq-r12           INTEGER {1..63}
OPTIONAL,
    lateNonCriticalExtension        OCTET STRING
OPTIONAL,
    nonCriticalExtension            SEQUENCE {}
```

```
OPTIONAL
}
SL-CommTxResourceReq-r12 ::= SEQUENCE {
    carrierFreq-r12                 ARFCN-ValueEUTRA-r9
OPTIONAL,
    destinationInfoList-r12         SL-DestinationInfoList-r12
}
SL-DestinationInfoList-r12 ::=      SEQUENCE (SIZE {1..maxSL-
Dest-r12}} OF SL-DestinationIdentity-r12
SL-DestinationIdentity-r12 ::=      BIT STRING {ZIE {24} }
--ASN1STOP
```

| SidelinkUEInformation field descriptions |
|---|
| commRxInterestedFreq<br>Indicates the frequency on which the UE is interested to receive sidelink direct communication.<br>commTxResourceReq<br>Indicates the frequency on which the UE is interested to transmit sidelink direct communication as well as the sidelink direct communication transmission destination(s) for which the UE requests E-UTRAN to assign dedicated resources.<br>destinationinfoList<br>Indicates the destination which is identified by the ProSe Layer-2 Group ID as specified in TS 23.303 [68].<br>discRXinterest<br>Indicates that the UE is interested to monitor sidelink direct discovery announcements.<br>discTXResourceReq<br>Indicates the number of resources the UE requires every discovery period for transmitting sidelink direct discovery announcement. It concerns the number of separate discovery message(s) the UE wants to transmit every discovery period.<br>SidelinkUEInformationList<br>Indicates if the UE needs to support (receive and/or transmit) SL for both Rel. 12 and Rel. 13 (Relay Discovery) purpose simultaneously. |

Figure 16:
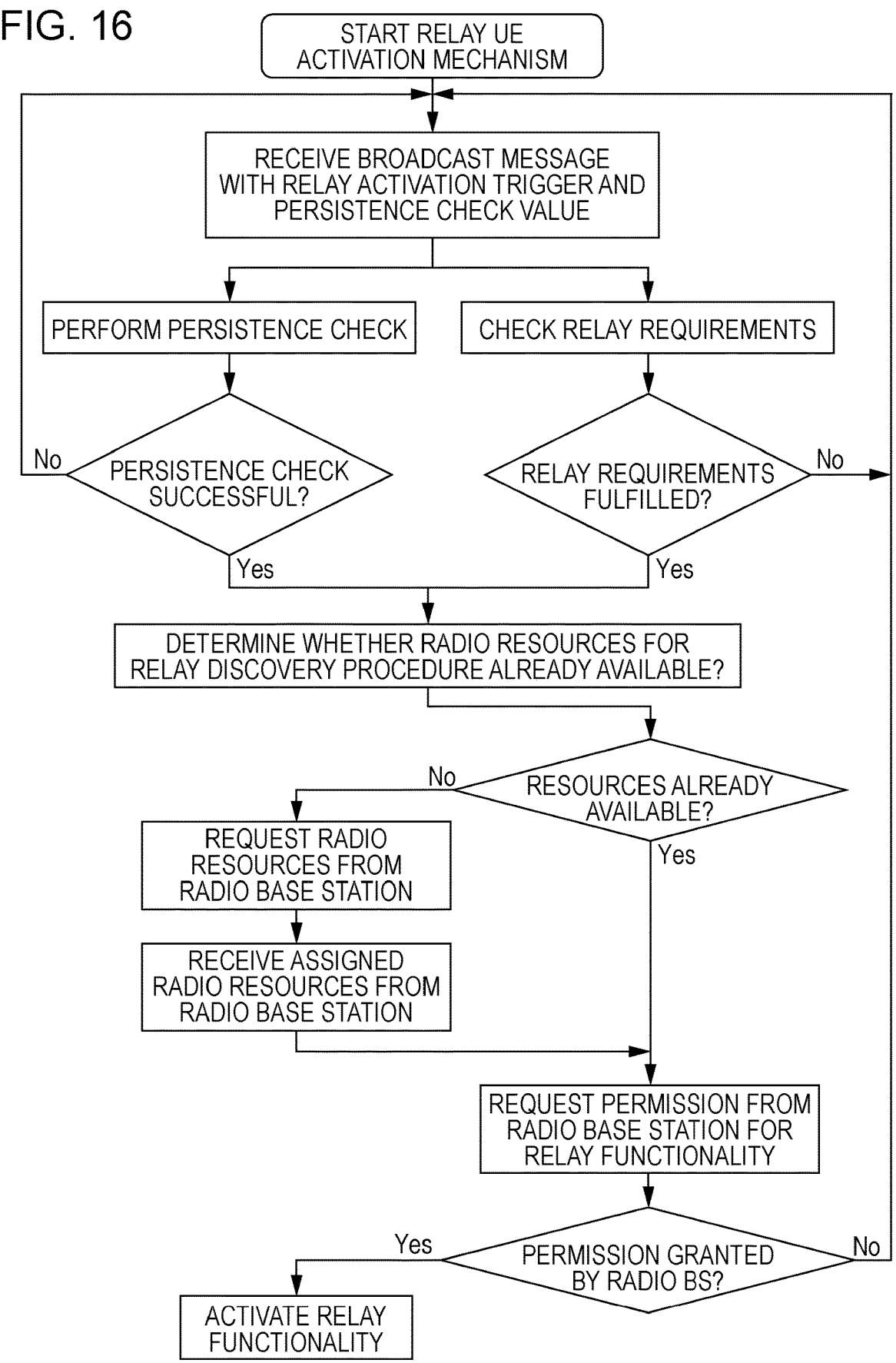
FIG. 16 is a sequence diagram for the relay UE behavior according to a further implementation of the first embodiment where the relay UE additionally determines whether radio resources are already available for the relay discovery procedure and react accordingly.

One particular exemplary implementation of how to check and request for radio resources is illustrated in FIG. 16, which is based on the previous implementation discussed in connection with FIG. 15 that additionally requires the relay UE to first seek permission from the eNodeB before activating the relay functionality. However, it should be noted that alternatively this particular implementation will also be possible without the additional request for permission performed by the relay UE; i.e., by extending the relay activation procedure as explained in connection with FIG. 13 and FIG. 14 with the above mentioned additional steps where the relay UE determines whether radio resources are needed and, if so, requests and receives the grant of radio resources from the eNodeB.

A corresponding extension of the exemplary implementation explained in connection with FIG. 14 is illustrated by the sequence diagram of FIG. 17, albeit with a slight variation. As explained already in connection with FIG. 16, the relay UE additionally determines whether radio resources are already available for the relay discovery procedure, and in case no such resources are available, the relay UE continues with a corresponding request towards the eNodeB. Then, depending on whether radio resources are assigned or not, the relay UE continues to activate the relay functionality (in case radio resources are indeed assigned) or terminates the relay activation procedure (in case no radio resources are assigned). Therefore, in this advantageous implementation, the request for resources can be reused for seeking permission to activate the relay functionality or not. In particular, the request for radio resources transmitted by the relay UE to the radio base station can be seen as an implicit request for permission, since the eNodeB will have the opportunity to give or deny permission to activate the relay functionality to particular relay UEs by assigning or not assigning radio resources in response to the radio resource request. Correspondingly, when the eNodeB decides that the requesting relay UE shall not activate its relay functionality, it may simply assign no resources to the relay UE (either by not transmitting a response message back to the relay UE, or by responding with a corresponding information that no radio resources are assigned) which thus is interpreted by the relay UE in that the eNodeB does not give permission to activate the relay functionality. On the other hand, when the eNodeB decides that the requesting relay UE shall indeed activate its relay functionality, by providing corresponding information on the assigned radio resources, the eNodeB will implicitly permit the relay UE to activate the relay functionality.

Figure 17:
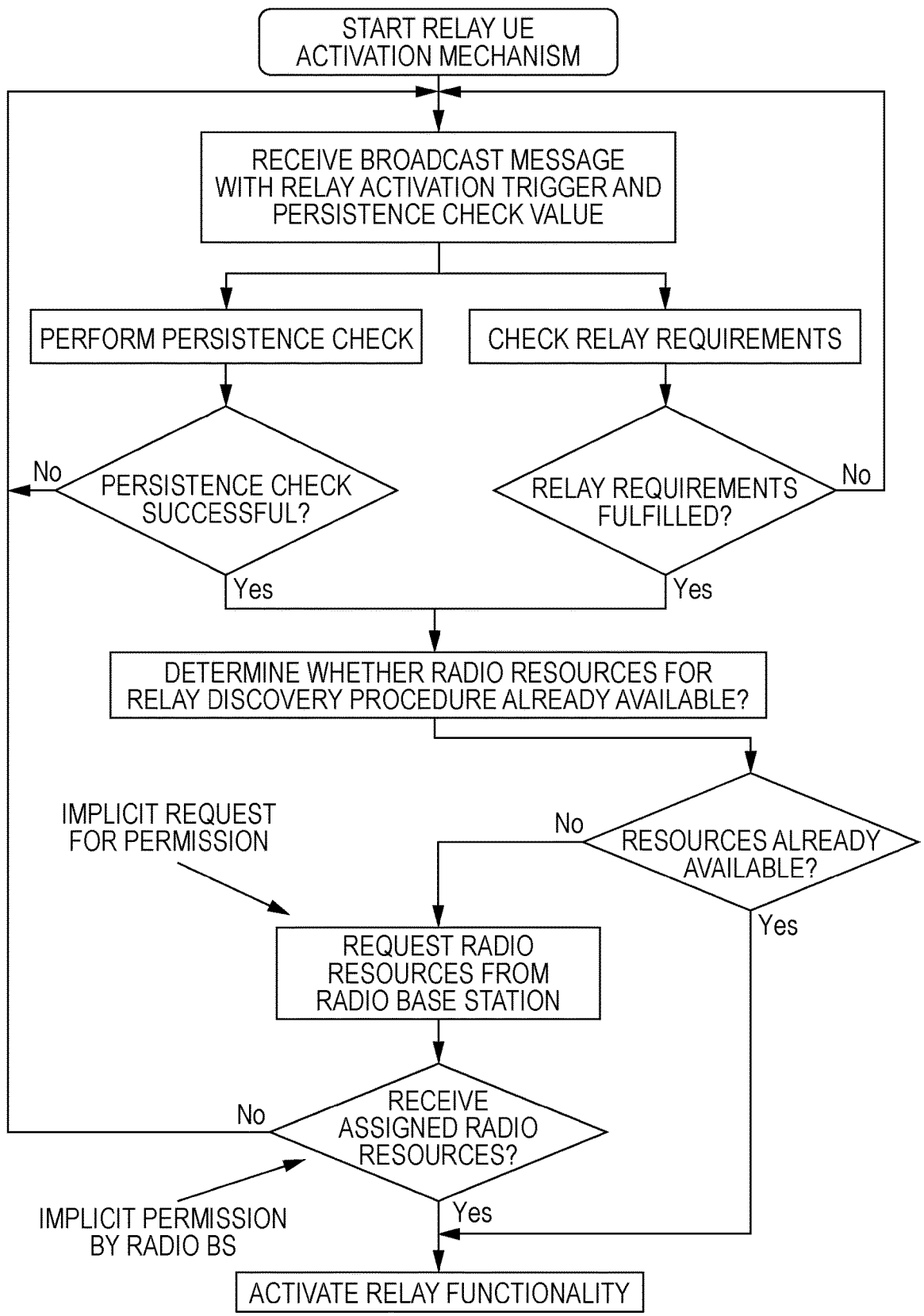
FIG. 17 is a sequence diagram for the relay UE behavior according to still another implementation of the first embodiment.

In the implementation according to FIG. 17 the additional steps for determining and requesting radio resources are provided after the two checks (relay requirements check and persistence check), since this sequence avoids transmitting additional messages via the Uu link to the radio base station for the case that one of said two checks fails. Nevertheless, theoretically, these steps for determining and requesting radio resources may alternatively be provided before the persistence check and/or the relay requirement check such that the persistence check and/or the relay requirement check is/are only performed after radio resources are available (either, by having been available before, or after having requested them).

Figure 18:
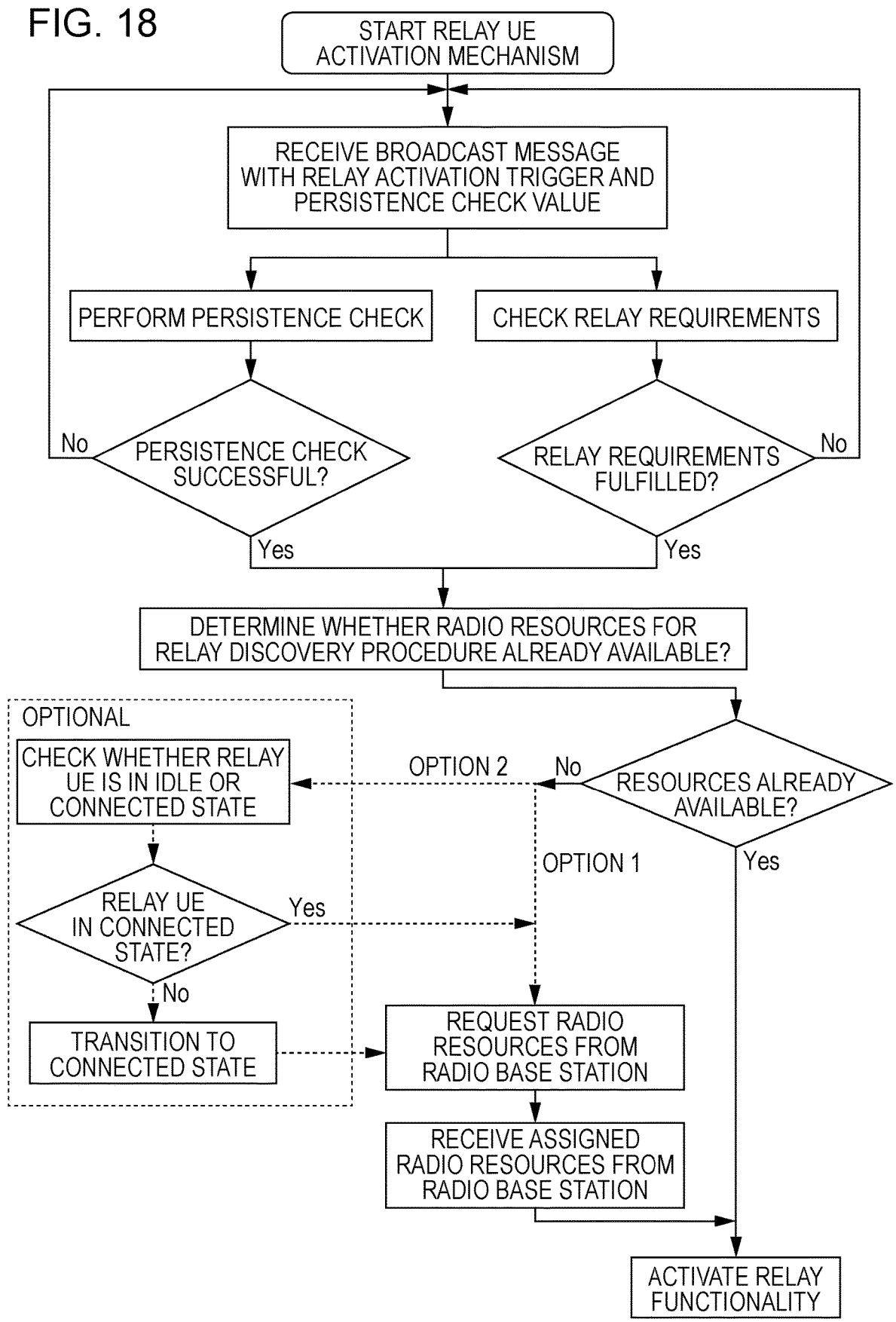
FIG. 18 is a sequence diagram for the relay UE behavior according to another implementation of the first embodiment, where the procedure takes into account whether the relay UE is an idle or a connected state and react accordingly.

A further variant of the first embodiment will be explained in connection with FIG. 18, which additionally takes into account whether a relay UE is in an RRC idle or RRC connected state. In order to explain this additional improvement, it is exemplarily assumed that the relay activation procedure also includes the steps where the relay UE determines whether the resources are available for the relay discovery procedure or not as explained before. However, it should be noted that this additional improvement of taking into account the idle/connected state of the UE can also be included standalone in the relay activation procedure (i.e., without having to have the radio resource determination). In general, the relay UE may be in RRC connected or idle state when performing the relay discovery procedure while it will be necessary for the relay UE to transition to the connected state once it is selected by a remote UE to act as a relay since the relay UE needs to forward and receive data on the Uu link for the relaying. Thus, for instance the relay UE may perform the relay discovery procedure in RRC idle state, however will then transition to the RRC connected state once it has been selected to become a relay for a remote UE. Nevertheless, in case of relaying eMBMS traffic to the remote UE, the relaying may be done by the relay UE in RRC idle as well. Moreover, for those advantageous implementations of the first embodiment involving a direct dedicated signaling with the radio base station (e.g., for requesting resources and/or requesting permission to activate the relay functionality), the relay UE shall be in a RRC connected state so as to be able to perform this dedicated signaling. Therefore, in advantageous implementations of the first embodiment a relay UE in idle state will first transition to the connected state before continuing/finalizing the relay activation procedure. To said end, the relay UE may first determine the particular RRC state, idle or connected, and in case the relay UE is in the idle state, the relay UE would have to perform the corresponding procedure to transition to the connected state, before continuing with the relay activation procedure (in the particular example of FIG. 18 so as to request radio resources from the radio base station by dedicated signaling).

It should be noted, that the step of transitioning from the idle state to the connected state can be performed, e.g., by a RRC connection procedure. A particular implementation of such a procedure for transitioning from RRC idle to RRC connected state is already standardized in 3GPP, e.g., the RRC connection establishment procedure defined by the technical standard TS 36.331, current version v12.6.0, in clause 5.3.3, incorporated herein by reference. In summary, after performing a random-access by the relay UE, the relay UE will transmit an RRC connection request message (RRCConnectionRequest message) to the eNodeB which in turn then responds by transmitting an RRC connection response message (RRCConnectionSetup), including the necessary parameters, so as to establish the RRC connection between the relay UE and the eNodeB; this further includes a UE context based on a UE specific RRC level identity called C-RNTI. The UE is further identified on the Uu link based on this C-RNTI which is retained both in the UE and the eNodeB until the RRC Connection is released. It should be noted that once a relay UE has transitioned to the connected state, it will usually stay in the connected state until the connection is released by the eNodeB or until the UE has to transition to Idle Mode after a Radio Link failure wherein a Re-establishment of RRC Connection was not possible (clause 5.3.7 of TS 36.331).

Consequently, relay UEs in idle state may also be enabled to successfully finish the relay activation procedure particularly for those implementations of the first embodiment where dedicated signaling is required so as to successfully finish the relay activation procedure.

Figure 19:
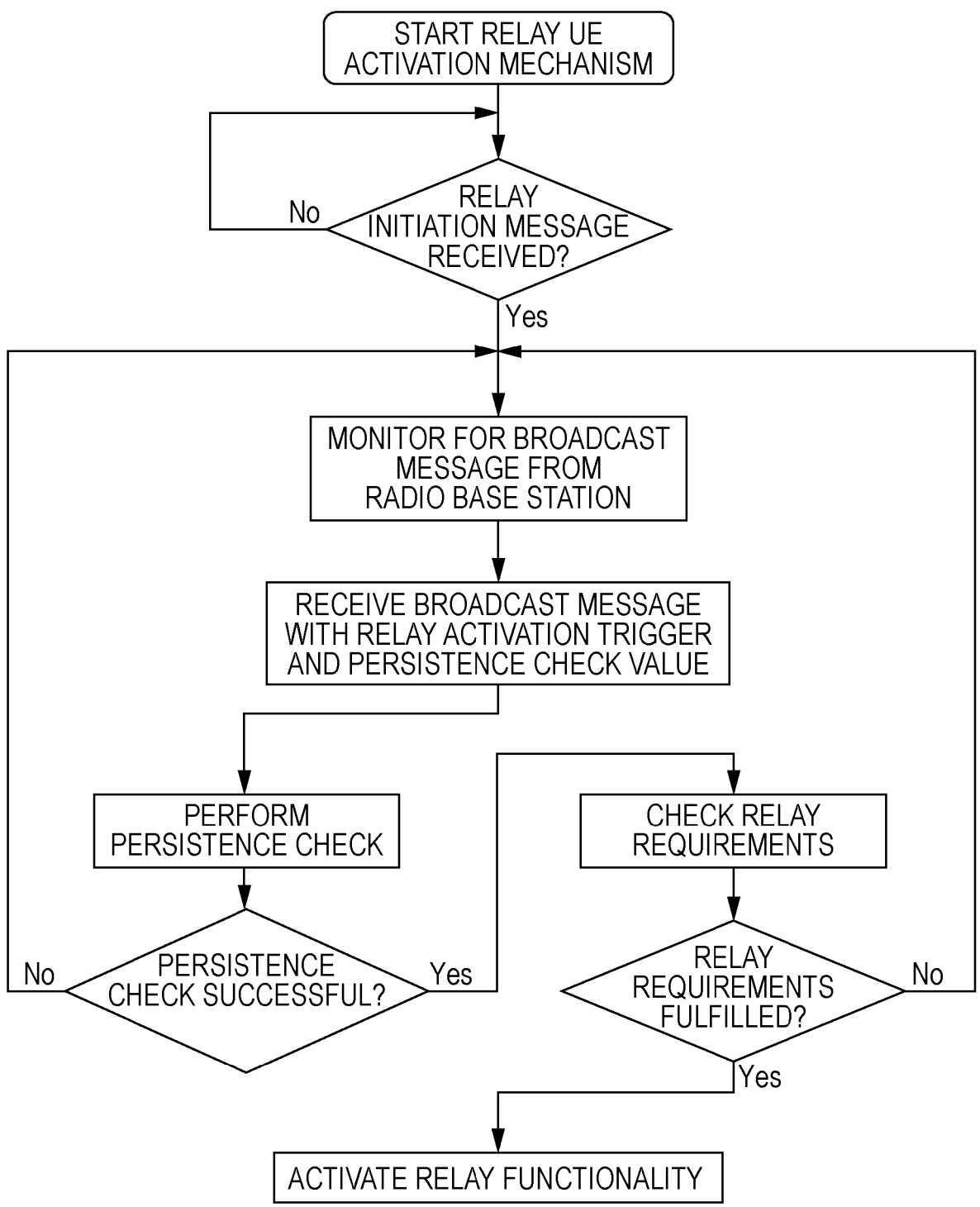
FIG. 19 is a sequence diagram for the relay UE behavior according to another implementation of the first embodiment, where a ProSe function provides a further level of control for initiating the relay activation.

According to further variants of the first embodiment, the ProSe function in the network will also have control on the relay activation as will be explained in the following in connection with the exemplarily illustration of FIG. 19. In particular, the ProSe function will transmit a corresponding relay initiation message to the relay UE as a first trigger such that the relay UE will start monitoring corresponding radio resources via which the broadcast message will be transmitted by the eNodeB. In particular, in order to maintain some network control over the relay situation in the respective radio cells, the ProSe function (for example additionally in consultation with the ProSe application server) may decide that particular radio cells shall provide relays (even though further control might rest with the eNodeB as explained before), e.g., when it is informed of some special public safety scenario in certain geographical areas/cells. By transmitting a corresponding relay initiation message to the relay-capable UE(s) in the radio cell, the ProSe function will thus trigger the relay UE to broadcast messages from the eNodeB (e.g., as defined in clause 5.2 of TS 36.331, incorporated herein by reference) to actually trigger the relay activation procedure in the relay UE. As apparent from FIG. 19, the relay UE will thus monitor and eventually receive the relay initiation message in which case it will start monitoring radio resources so as to receive the broadcast message from the eNodeB.

Alternatively, or in addition, the ProSe function might transmit a similar message to the eNodeB to initiate relay activation through the eNodeB. The eNodeB in turn might then immediately conclude from the corresponding relay initiation message received from the ProSe function that further relays are necessary, and will thus transmit the previously discussed broadcast message in the radio cell to the relay UE(s). Alternatively, the eNodeB, upon receiving such relay initiation message from the ProSe function, will then determine whether indeed further relays are necessary, e.g., based on the number of remote UEs in the radio cell that have a bad radio link with the eNodeB, and/or based on the number of remote UEs running public safety services and the radio cell. To explain further, an eNodeB may decide on the number of relay UEs that are required in the cell based on possibly many factors including a feedback from the ProSe function which the eNB can receive through proprietary interface(s) or through core network elements like MME, or purely based on OAM configuration from the network, e.g., stating that certain number of relays are required every square kilometer, or purely based on its own deduction from the number of UE running PS services in the cell (which in turn is clear from the CQI classes of the bearers being served by the eNB) and some statistical calculation on how many relay UEs are generally required per certain number of UEs running PS services; or, the eNodeB determination on the number of relay UEs that are required in the cell could purely be based on UE reporting their requirement for Relay service. The last, i.e., the UE reporting their requirement for Relay service could be based on the in-coverage public safety UEs experiencing bad radio quality (on Uu interface) and the eNodeB extrapolating this figure to include a possible number of out of coverage UEs. This determination may be performed periodically by the eNodeB after receiving the relay initiation message.

This determination by the eNodeB as to whether further relays are necessary, as just explained above, can likewise be performed in implementations of the first embodiment that do not comprise the relay initiation message exchange from the ProSe function, e.g., in the implementations explained in connection with FIGS. 13 to 18 (and corresponding variants thereof). In that case, the eNodeB will also periodically determine whether further relays are necessary or not.

Figure 20:
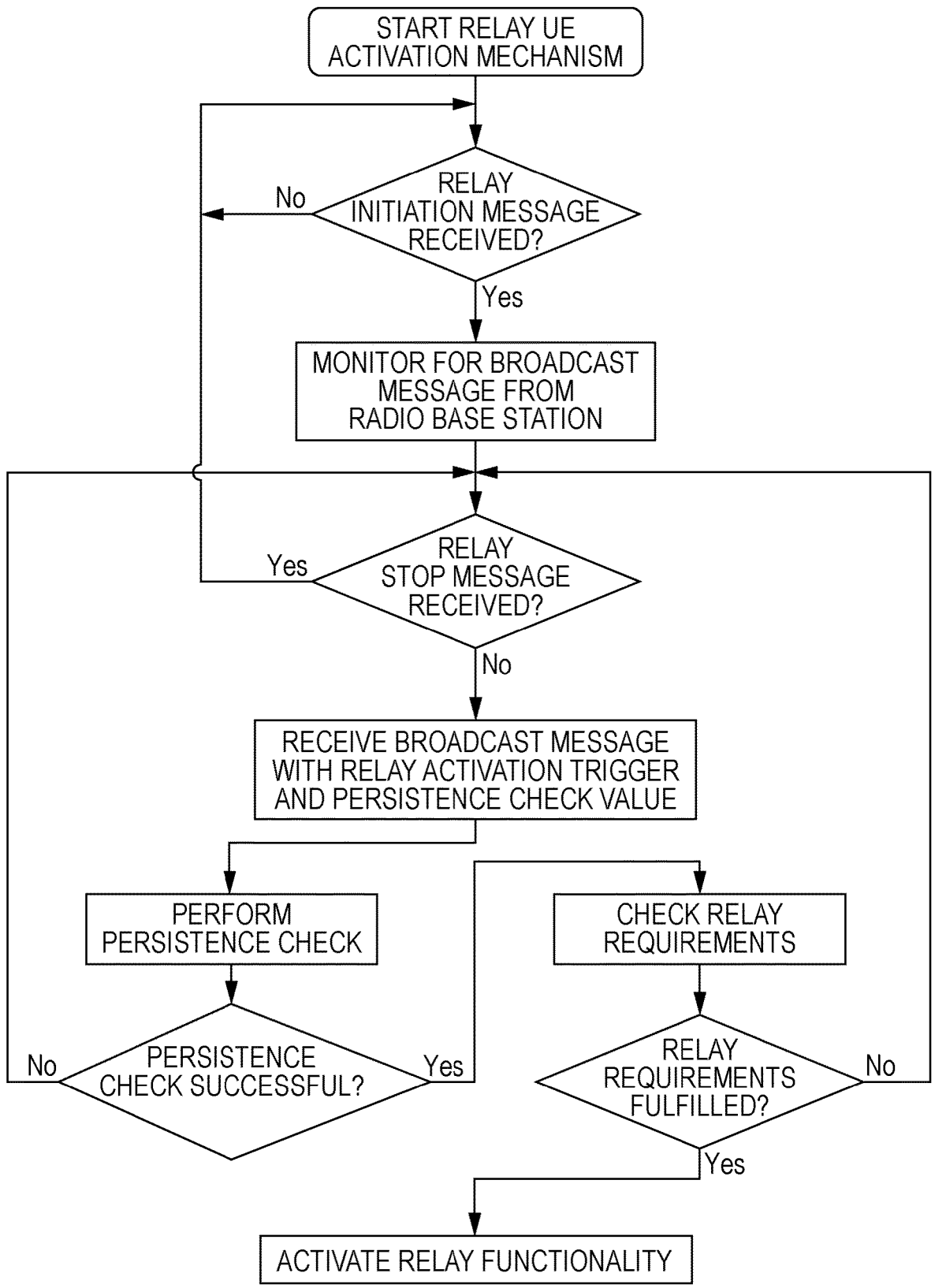
FIG. 20 is a sequence diagram for the relay UE behavior according to another implementation of the first embodiment, where a ProSe function additionally is able to terminate the relay activation.

A further advantageous and extended version of the implementation of the first embodiment as explained in connection with FIG. 19, will be explained in connection with FIG. 20. As apparent therefrom, an additional determination has been introduced into the relay activation procedure namely as to whether a relay stop message is received from the ProSe function. In an opposite manner as for the relay initiation message, the ProSe function (for example in addition in consultation with the ProSe Application Server) may decide that particular radio cells shall not provide any relays anymore and may thus correspondingly transmit a relay stop message in the radio cell. Correspondingly, in case the relay UE receives such relay stop message, it will stop monitoring for the broadcast message from the eNodeB.

According to further advantageous implementation of the first embodiment, the broadcast message is extended with additional information that is useful for performing the relay activation procedure in the relay UE. As has been explained before, the broadcast message shall include the persistence check value as well as function as the trigger for the relay UE to start the relay activation procedure. Additionally, the broadcast message may include the additional relay requirements to be fulfilled in the radio cell and which are checked by the relay user equipment during the relay activation procedure. As mentioned before in a particular implementation of the first embodiment, the eNodeB may be the entity to determine the particular relay requirements for its cell, and will thus be able to correspondingly include information on the relay requirements in the broadcast message transmitted in its radio cell. Advantageously, the presence of this information on the relay requirements in the broadcast message can be implicitly regarded as the indication that further relays are necessary in the radio cell (i.e., can be implicitly regarded as the trigger to start the relay activation procedure in the relay user equipment) such that a separate indication in said respect is not necessary.

Alternatively or in addition, according to a further implementation of the first embodiment, the broadcast message may be extended with information on the radio resources that can be used by the relay UE to perform the relay discovery procedure after activating its relay functionality. For instance, the information on the radio resources provided by the eNodeB in the broadcast message can be the same or similar to the previously discussed relay discovery resource pool from which the user equipment then can, e.g., autonomously select radio resources to perform the relay discovery. On the other hand, when assuming that the relay discovery resource pool information was already provided to the relay UE (e.g., via the system information), this information on the radio resources provided by the eNodeB in the broadcast message can refer to only part of the whole relay discovery resource pool. In any case, by providing corresponding radio resources already in the broadcast message transmitted by the eNodeB, it will not be necessary to additionally request radio resources later on during the relay activation procedure as for instance explained in connection with some of the implementations of the first embodiment where the relay activation procedure comprises steps to determine whether radio resources are already available for the relay discovery procedure (see e.g., FIGS. 16 and 17). Advantageously, the presence of such resource information in the broadcast message can be implicitly regarded as the indication that further relays are necessary in the radio cell (i.e., can be implicitly regarded as the trigger to start the relay activation procedure in the relay user equipment) such that a separate indication in said respect is not necessary.

A further advantageous implementation of the first embodiment provides the additional mechanism of deactivating relay functionality as necessary, such that a relay UE will not unnecessarily keep sending relay discovery messages thereby further depleting its battery and congesting the corresponding relay discovery radio resources. Correspondingly, for this implementation it is assumed that relay UEs have already activated its relay functionality and may or may not serve as a relay for other remote UEs. According to this implementation, the eNodeB may decide to no longer provide any relays in its radio cell or simply may decide to reduce the number of relays in its radio cell. In any case, a mechanism is provided by this implementation so as to allow the eNodeB to deactivate all or only specific relay(s) UE. In said respect, the eNodeB may use a corresponding relay deactivation command message which may be either broadcast in the radio cell or be directly transmitted to the relevant relay UE(s) which relay functionality shall be deactivated. In more detail, in case the eNodeB would like to deactivate all relays in its radio cell, it may decide to broadcast a corresponding deactivation command to be received by all relay UEs in its radio cell, where each of the relay UEs will follow the command and, when having relay functionality activated, will deactivate the relay functionality. On the other hand, the eNodeB may also use dedicated signaling respectively with only one relay, so as to deactivate the relay functionality of said relay UE. However, it should be noted that the eNodeB will not be able to reach relay UEs that are in an idle state by using the dedicated signaling. In this case, the eNodeB may alternatively or additionally use broadcast signaling to deactivate the relay functionality specifically of only those relay UEs with activated relay functionality that are in an idle state. Relay UEs in idle state will receive the broadcast signaling with the special indication and will in response deactivate the relay functionality (if it was activated). As a further example, the broadcast message can even use the persistence check mechanism, as already described, to deactivate only part of the whole set of activated relays.

Alternatively, the relay deactivation may also be initiated by the relay UE, e.g., when the relay UE has stopped serving as a relay for any remote UE for a particular period of time or in case the ProSe function informs the UE to stop being a relay. In this case, the relay UE may transmit a corresponding relay deactivation request message to the eNodeB, which in turn may then decide whether indeed the relay UE shall deactivate its relay functionality or not. Correspondingly, the eNodeB will transmit a response message back to the relay UE providing the corresponding deactivation command or not.

In particular implementations according to the 3GPP environment, the RRCConnectionReconfiguration message can be reused to serve as the relay deactivation command.

Second Embodiment

In the following a second embodiment is presented which deals with the following problem. In particular, the current standardization for the ProSe relay functionality does not specify when a remote user equipment begins and stops sending data via the PC5 interface. In other words, no particular agreements were reached in the current 3GPP standardization as to when a remote UE shall start transmitting/receiving data via the relay connection instead of via the direct Uu link with the eNodeB. It is also unclear when the remote UE should switch back to the Uu link.

It should be noted that in general, the remote UE shall prefer using the Uu link, instead of the PC5 link. Consequently, the relay operation should be started only when the Uu link is quite week/unsustainable or inefficient and/or should be stopped when the remote UE can be served again by the eNodeB directly over the Uu link. This is since a dynamic scheduling based on various measurement reporting, CSI reporting, etc., is possible and performed on the Uu interface but not for the PC5 link.

For discussing the second embodiment, it is assumed that the remote UE will eventually select a relay UE from among one or more possible discovered relay UEs (discovered by performing relay discovery as, e.g., explained in the background section). Correspondingly, this will also include establishing a corresponding direct connection with the relay UE over which the communication can then be relayed. In particular, such a direct connection can be established as explained in the background section, e.g., by establishing the layer-2 link between the relay UE and the remote UE.

It is now important to decide at which point of time (after the relay UE has been selected by the remote UE and the corresponding direct connection between the relay UE and the remote UE has been established) the actual data switch (to the PC5 interface) should take place. There are several options. For instance, a remote UE may autonomously decide if at all and when to start transmitting/receiving data over the PC5 link. This autonomous decision can be based on a number of different options including Uu and/or PC5 link quality, transmission power required on each link and other similar considerations.

For example, a remote UE may start transmitting data over the PC5 link if the corresponding Uu link quality between the remote UE and the radio base station falls below a specific configured threshold. As a still further alternative, a remote UE may be configured to immediately start transmitting data over the PC5 link after having successfully established the layer-2 link with the relay UE.

In any case, the remote UE may inform the eNodeB about the path switch to the PC5, such that the eNodeB in turn may be able to release and deconfigure existing data bearers such that the communication of the remote UE now continues to be relayed to the remote UE via the relay UE.

Alternatively, the remote UE may directly start using the communication link with the selected relay UE without having informed the eNodeB beforehand, for instance by sending Unacknowledged data packets (e.g., PDCP SDUs) to the relay UE. In turn, the relay UE will then inform the eNodeB, which in turn will start sending the downlink (PDCP) unacknowledged data packets to the remote UE via the selected relay user equipment. The knowledge of "which" remote UE may be conveyed to eNB via the relay, using the C-RNTI assigned to the UE on the Uu link that was being used immediately before the UE moved to PC5.

In general, all the data switches (from Uu to PC5, and from PC5 to Uu) that are performed by the remote UE (and the relay UE) should be informed to the application layer from the access stratum. This is since the application layer in this case, e.g., Proximity Function may need to map the radio network layout (e.g., Cell and tracking area Id) to its own infrastructure.

Further solutions are provided to successfully move the UE's connection from the PC5 link back to the Uu link. In this regard, it is now assumed that the relay UE is acting as the relay for the remote UE such that the communication of the remote UE is relayed between the eNodeB and the remote UE via the relay UE. According to one solution, a handover-like procedure could be used to move the remote user back to the Uu link. In particular, the remote UE may send the usual measurement reports to the eNodeB via the relay connection. For instance, the old measurement configuration, received previously when being connected to the eNodeB via the Uu link, can be maintained after the PC5 data switch and thus may be used for measuring the Uu link even when the remote user equipment is on the PC 5 link. A corresponding handover message (such as the RRCConnectionReconfiguration message with the MobilityControlInfo of TS 36.331, current version 12.6.0, incorporated herein by reference) could be sent by the eNodeB via the relay UE to the remote UE. In this particular case, the Uu link to which it should be switched back could belong to the same old (source) cell or could belong to any other neighbor cell. However, the solution has a problem in that the UE and the eNodeB retain the Uu context(s) (including the configuration) as well as that the RRC message signaling via the PC5 link is disadvantageous since the link is supposed to be used only to convey the higher layer data (e.g., the application data), and the lower layer signaling transport on PC5 may be avoided since in this regard the same complexity may need to be supported as to maintain the RRC Connection on the Uu interface.

On the other hand, as mentioned before, the remote UE may switch back to using the Uu link (instead of the PC5 interface link) when the Uu link quality is sufficiently good. In said case, the RRC connection establishment procedure can be performed by the remote UE, advantageously indicating as the cause of the connection establishment that the remote UE would like to move from the PC5 interface to the Uu interface. According to an exemplary implementation in the 3GPP standards environment, the RRC connection establishment procedure according to the technical standard TS 36.331 (version v12.6.0, in clause 5.3.3, incorporated herein by reference) can be reused.

In order to properly determine by the remote UE when the Uu link is better again, the remote UE may for instance perform certain radio link measurements such as those involving RSRP and/or RSRQ, and/or pathloss information, etc. A corresponding minimum threshold can be defined for each of the respective radio link measurements, which the Uu link must fulfill so as to be determined as being sufficiently good to switch back to. For example, each of the predefined threshold could be configured by the eNodeB, and corresponding information on the thresholds could be provided to the remote UE while it was still reachable via the Uu link (i.e., prior to performing the data switch to the PC5 link).

According to an alternative implementation of the second embodiment, the remote UE will use the cell selection criteria (as defined in TS 36.304) to determine when the Uu is good enough to initiate a data switch back to said Uu link. In particular, the 3GPP technical standard TS 36.304, current version 12.5.0, defined in clause 5.2.3.2 cell selection criteria, which are used to evaluate a cell for the cell selection procedure described in clause 5.2, incorporated herein by reference. The following is an excerpt of clause 5.2.3.2 of said standard TS 36.304:

The cell selection criterion S is fulfilled when:

$$Srxlev > 0 \text{ AND } Squal > 0$$

where:

$$Srxlev = Q_{rxlevmeas} - (Q_{rxlevmin} + Q_{rxlevminoffset}) - Pcompensation - Qoffset_{temp}$$

$$Squal = Q_{qualmeas} - (Q_{qualmin} + Q_{qualminoffset}) - Qoffset_{temp}$$

where:

| | |
|---|---|
| Srxlev | Cell selection RX level value (dB) |
| Squal | Cell selection quality value (dB) |
| $Qoffset_{temp}$ | Offset temporarily applied to a cell specified in (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The signaled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN the UE may check the S criteria of a cell using parameter values stored from a different cell of this higher priority PLMN.

Correspondingly, the remote UE may reuse this cell selection criterion so as to determine when the Uu link is sufficiently good again so as to switch back to same.

According to a further improvement, a new monitoring behavior is provided for the remote UE. In particular, since the remote UE is supposed to only be running public safety applications, it may only selectively need to monitor those specific discovery resource pools that are specifically defined for being used for relay discovery for these public safety applications. Consequently, it is not necessary for the remote UE to monitor other discovery resource pools, thereby being able to save battery.

Further Embodiments

According to a first aspect, a method is provided for activating a relay functionality of a relay user equipment within a mobile communication network. The relay user equipment is capable of performing direct communication over a direct sidelink connection respectively with one or more remote user equipments. The relay user equipment is located in a radio cell controlled by a radio base station in the mobile communication network and supports a relay functionality for being capable of serving as a relay, respectively for the one or more remote user equipments, so as to relay communication between the one or more remote user equipments and the radio base station via the direct sidelink connection. The method comprises the following steps. The radio base station determines whether or not further relays are necessary in the radio cell. In case it is determined that further relays are necessary in the radio cell, the radio base station selects a persistence check value and transmits a broadcast message in the radio cell. This broadcast message at least indicates that further relays are necessary in the radio cell and comprises the selected persistence check value. The relay user equipment receives the broadcast message, and then activates its relay functionality in case the relay user equipment determines that relay requirements for activating its relay functionality in the radio cell are fulfilled by the relay user equipment and in case a persistence check performed by the relay user equipment based on the received persistence check value is successful.

According to a second aspect which is provided in addition to the first aspect, the step of performing by the relay user equipment the persistence check comprises that the relay user equipment generates a random value within a range of values and compares the generated random value with the received persistence check value, having been selected by the radio base station within the same range of values, to determine whether the persistence check is successful or not. For example, in case the generated random value is smaller than or equal to the received persistence check value, the persistence check is successful.

According to a third aspect which is provided in addition to the first or second aspect, the method may include further steps after receiving the broadcast message and before the step of activating the relay functionality. In particular, the relay user equipment determines whether radio resources are already configured for the relay user equipment to perform a relay discovery procedure to announce its presence as a relay. In case no radio resources are already configured for the relay user equipment to perform the relay discovery procedure, the relay user equipment requests from the radio base station radio resources to perform the relay discovery procedure, and then receives from the radio base station information on whether and which radio resources are assigned to perform the relay discovery procedure.

According to a fourth aspect which is provided in addition to any of the first to third aspects, the method may include further steps after receiving the broadcast message and before the step of activating the relay functionality. In particular, the relay user equipment transmits to the radio base station a relay activation request message, requesting permission from the radio base station to activate the relay functionality of the relay user equipment. The relay user equipment receives from the radio base station a relay activation response message, giving or denying the permission for the relay user equipment to activate the relay functionality. Then, the step of activating by the relay user equipment its relay functionality is performed in case of receiving the relay activation response message giving the permission to activate the relay functionality.

According to a fifth aspect which is provided in addition to the third and fourth aspects, the step performed by the relay user equipment of requesting radio resources from the radio base station to perform the relay discovery procedure comprises including said request for radio resources in the relay activation request message transmitted by the relay user equipment to the radio base station to request the permission from the radio base station to activate its relay functionality. Furthermore, the step performed by the relay user equipment of receiving from the radio base station the information on whether and which radio resources are assigned to perform the relay discovery procedure comprises including said information in the relay activation response message transmitted by the radio base station to give or deny the permission for the relay user equipment to activate its relay functionality. For example, the radio base station, by assigning radio resources to the relay user equipment for the relay discovery procedure, gives the permission for the relay user equipment to activate its relay functionality, and wherein the radio base station, by not assigning radio resources to the relay user equipment for the relay discovery procedure, denies the permission for the relay user equipment to activate its relay functionality.

According to a sixth aspect which is provided in addition to this fourth or fifth aspect, wherein the relay activation request message further comprises: 1) information on one or more services that can be provided by the relay user equipment to remote user equipments, such as public safety services or non-public safety services, preferably allowing the radio base station to determine a priority associated with the one or more provided services, 2) group identification information of one or more services that can be provided by the relay user equipment to remote user equipments, the group identification information giving information as to which group each of the one or more provided services belongs to, or 3) a request for radio resources for the relay user equipment to perform direct discovery to announce its presence as a direct communication user equipment by transmitting discovery messages in the radio cell.

According to a seventh aspect which is provided in addition to any of the first to sixth aspects, the method further comprises the following steps after receiving the broadcast message and before the step of activating the relay functionality. The relay user equipment determines whether the relay user equipment is in an idle state or in a connected state. In case the relay user equipment is in an idle state, the relay user equipment transitions to the connected state so as to be able to request resources from the radio base station to perform a relay discovery procedure and/or to be able to request permission from the radio base station to activate the relay functionality of the relay user equipment. For example, the step of the relay user equipment transitioning to the connected state comprises performing by the relay user equipment a connection request procedure with the radio base station. This connection request procedure may indicate as an establishment cause the need to request radio resources to perform the relay discovery procedure and/or the need to seek permission to activate the relay functionality. Correspondingly, the radio base station determines whether to deny or permit the connection request based on the establishment cause. The establishment cause can be determined by the radio base station during the connection request procedure from a Radio Resource Control protocol header of a message of the connection request procedure, or from a Medium Access Control protocol header of a message of the connection request procedure or from a random access preamble transmitted by the relay user equipment during the connection request procedure.

According to an eighth aspect which is provided in addition to any of the first to seventh aspect, the broadcast message transmitted by the radio base station in the radio cell further comprises information on the relay requirements to be fulfilled by relay user equipments in the radio cell. For example, the indication that further relays are necessary is comprised in the broadcast message separately from the information on the relay requirements, or the relay user equipment determines that further relays are necessary from the presence of the information on the relay requirements in the broadcast message and/or from the presence of the persistence check value in the broadcast message.

According to a ninth aspect which is provided in addition to any of the first to eighth aspects, the broadcast message transmitted by the radio base station in the radio cell further comprises information on radio resources to be used by the relay user equipment for a relay discovery procedure to announce the presence of the relay user equipment as a relay. For example, the indication that further relays are necessary is comprised in the broadcast message separately from the information on the radio resources for the relay discovery procedure, or the relay user equipment determines that further relays are necessary from the presence of the information on the radio resources for the relay discovery procedure in the broadcast message and/or from the presence of the persistence check value in the broadcast message.

According to a tenth aspect which is provided in addition to any of the first to ninth aspect, the relay requirements comprise at least one of the following: 1) a minimum and/or maximum threshold for a radio link quality of a link between the relay user equipment and the radio base station, preferably wherein the radio link quality is determined based on a reference signal receive power, RSRP, and/or a reference signal received quality, RSRQ, 2) a maximum threshold for a movement level of the relay user equipment, such as the speed of the relay user equipment, and 3) a minimum threshold for a battery level of the relay user equipment.

According to an eleventh aspect which is provided in addition to any of the first to tenth aspects, upon activating the relay functionality, the relay user equipment performs a relay discovery procedure to announce its presence as a relay in the radio cell by transmitting relay discovery messages in the radio cell. Each of the relay discovery messages being transmitted either after receiving from a remote user equipment a relay solicitation message, which requests discovery of relay user equipments, or periodically. For example, the relay user equipment is selected to serve as a relay for a first remote user equipment to relay communication and a first direct sidelink connection is established between the relay user equipment and the first remote user equipment such that communication exchanged by the first remote user equipment with the radio base station is relayed between the relay user equipment and the first remote user equipment via the first direct sidelink connection.

According to a twelfth aspect which is provided in addition to any of the first to eleventh aspect, the relay user equipment is assumed to have its relay functionality activated, in which case the method further comprises the following steps. The relay user equipment receives from the radio base station a relay deactivation command and, in response, deactivates its relay functionality. Alternatively, the relay user equipment transmits to the radio base station a relay deactivation request message, and then receives, in response, from the radio base station a relay deactivation response message that instructs the relay user equipment to deactivate or not its relay functionality. Correspondingly, the relay user equipment deactivates its relay functionality in case the relay deactivation response message instructs to deactivate the relay functionality.

According to a thirteenth aspect which is provided in addition to any of the first to twelfth aspect, the method comprises the following steps. The relay user equipment receives from a proximity services function in the mobile communication network a relay initiation message, and in response starts to monitor by the relay user equipment for receiving the broadcast message from the radio base station. For example, the method may further comprise the following steps. The relay user equipment receives from the proximity services function a relay stop message, and in response stops to monitor for receiving the broadcast message from the radio base station.

According to a fourteenth aspect which is provided in addition to any of the first to thirteenth aspect, the step performed by the radio base station to determine if further relays are necessary determines that further relays are necessary in case of receiving a relay initiation message from a proximity services function in the mobile communication network. Alternatively or in addition, the step performed by the radio base station to determine if further relays are necessary is based on the number of remote user equipments in the radio cell that have a bad radio link with the radio base station, and/or based on the number of remote user equipments running public safety services in the radio cell.

According to a fifteenth aspect, a relay user equipment is provided within a mobile communication network for activating a relay functionality. The relay user equipment is capable of performing direct communication over a direct sidelink connection respectively with one or more remote user equipments. The relay user equipment is located in a radio cell controlled by a radio base station in the mobile communication network and supports a relay functionality for being capable of serving as a relay, respectively for the one or more remote user equipments, so as to relay communication between the one or more remote user equipments and the radio base station via the direct sidelink connection. A receiver of the relay user equipment receives from the radio base station a broadcast message indicating that further relays are necessary in the radio cell and comprising a persistence check value selected by the radio base station. A processor of the relay user equipment activates, upon receiving the broadcast message, the relay functionality of the relay user equipment in case the relay user equipment determines that relay requirements for activating its relay functionality in the radio cell are fulfilled by the relay user equipment and in case a persistence check performed by the relay user equipment based on the received persistence check value is successful.

According to a sixteenth aspect which is provided in addition to the fifteenth aspect, the processor is configured to perform the persistence check by 1) generating a random value within a range of values, 2) comparing the generated random value with the received persistence check value, having been selected by the radio base station within the same range of values, to determine whether the persistence check is successful or not. For example, the processor determines that the persistence check is successful in case the generated random value is smaller than or equal to the received persistence check value.

According to a seventeenth aspect which is provided in addition to the fifteenth or sixteenth aspect, the processor determines, after the receiver receives the broadcast message and before the processor activates the relay functionality, whether radio resources are already configured for the relay user equipment to perform a relay discovery procedure to announce its presence as a relay. In case the processor determines that no radio resources are already configured for the relay user equipment to perform the relay discovery procedure, the processor requests from the radio base station radio resources to perform the relay discovery procedure, and the receiver receives from the radio base station information on whether and which radio resources are assigned to perform the relay discovery procedure.

According to an eighteenth aspect which is provided in addition to any of the fifteenth to seventeenth aspect, after the receiver receives the broadcast message and before the processor activates the relay functionality, a transmitter of the relay user equipment transmits to the radio base station a relay activation request message, requesting permission from the radio base station to activate the relay functionality of the relay user equipment. The receiver receives from the radio base station a relay activation response message, giving or denying the permission for the relay user equipment to activate the relay functionality. The processor activates the relay functionality in case of receiving the relay activation response message giving the permission to activate the relay functionality.

According to a nineteenth aspect provided in addition to the seventeenth and eighteenth aspects the processor requests the radio resources from the radio base station to perform the relay discovery procedure by including a request for radio resources in the relay activation request message to be transmitted by the transmitter to the radio base station to request the permission from the radio base station to activate its relay functionality. The receiver receives the relay activation response message transmitted by the radio base station to give or deny the permission for the relay user equipment to activate its relay functionality by receiving from the radio base station the information on whether and which radio resources are assigned to perform the relay discovery procedure.

According to a twentieth aspect provided in addition to any of the fifteenth to nineteenth aspect, after the receiver receives the broadcast message and the processor activates the relay functionality, the processor determines whether the relay user equipment is in an idle state or in a connected state. In case the processor determines the relay user equipment to be in an idle state, the processor transitions the relay user equipment to the connected state so as to be able to request resources from the radio base station to perform a relay discovery procedure and/or to be able to request permission from the radio base station to activate the relay functionality of the relay user equipment.

According to a 21st aspect provided in addition to any of the fifteenth to twentieth aspects, the receiver receives the broadcast message comprising information on the relay requirements to be fulfilled by relay user equipments in the radio cell. In addition or alternatively, the receiver receives the broadcast message comprising information on radio resources to be used by the relay user equipment for a relay discovery procedure to announce the presence of the relay user equipment as a relay.

According to a 22nd aspect provided in addition to any of the fifteenth to 21st aspect, the processor determines whether at least one of the following relay requirements is fulfilled. A minimum and/or maximum threshold for a radio link quality of a link between the relay user equipment and the radio base station, preferably wherein the radio link quality is determined based on a reference signal receive power, RSRP, and/or a reference signal received quality, RSRQ; a maximum threshold for a movement level of the relay user equipment, such as the speed of the relay user equipment; and a minimum threshold for a battery level of the relay user equipment.

According to a 23rd aspect provided in addition to any of the fifteenth to 22nd aspect, the relay user equipment has activated its relay functionality, and the receiver receives from the radio base station a relay deactivation command. The processor deactivates, in response to the relay deactivation command, the relay functionality. For example, the transmitter transmits to the radio base station a relay deactivation request message requesting the radio base station to deactivate or not the reader functionality of the relay user equipment.

According to a 24th aspect provides a radio base station for participating in activating a relay functionality of a relay user equipment within a mobile communication network. The relay user equipment is capable of performing direct communication over a direct sidelink connection respectively with one or more remote user equipments. The relay user equipment is located in a radio cell controlled by a radio base station in the mobile communication network and supports a relay functionality for being capable of serving as a relay, respectively for the one or more remote user equipments, so as to relay communication between the one or more remote user equipments and the radio base station via the direct sidelink connection. A processor of the radio base station determines whether or not further relays are necessary in the radio cell. The processor selects a persistence check value within a range of values. A transmitter transmits, to the one or more remote user equipments in the radio cell, relay requirements to be fulfilled before activating the relay functionality. The transmitter transmits a broadcast message in the radio cell in case the processor determines that further relays are necessary. The broadcast message at least indicates that further relays are necessary in the radio cell and comprises the selected persistence check value. The broadcast message indicates to the one or more relay user equipments in the radio cell to activate the relay functionality, in case the relay user equipment successfully performs a persistence check based on the persistence check value and in case that the relate user equipment fulfills the relay requirements.

According to a 25th fifth aspect which is provided in addition to the 24th aspect, the processor determines that further relays are necessary in case the receiver receives a relay initiation message from a proximity services function in the mobile communication network. Additionally or alternatively, the processor determines that further relays are necessary based on the number of remote user equipments in the radio cell that have a bad radio link with the radio base station and/or based on the number of remote user equipments running public safety services in the radio cell.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit which, in operation, controls operation of a radio base station, the integrated circuit comprising:
   transmission circuitry, which, in operation, transmits, to a relay user equipment in a radio cell controlled by the radio base station, a broadcast message indicating minimum and maximum thresholds of a radio link quality of a link between the relay user equipment and the radio base station and transmits, to a remote user equipment, a third threshold value and an offset value, the third threshold value indicating a minimum value of a radio link quality of a Uu link between the remote user equipment and the radio base station; and
   control circuitry, which is coupled to the transmission and which, in response to the relay user equipment activating a relay functionality based on that the radio link quality of the link between the relay user equipment and the radio base station is above the minimum threshold and below the maximum threshold and in response to the remote user equipment determining to perform direct communication between the remote user equipment and the relay user equipment based on that the radio link quality of the Uu link is below the third threshold value as adjusted by the offset value, performs communication with the remote user equipment via the relay user equipment that performs the direct communication over a direct link with the remote user equipment.

2. The integrated circuit according to claim 1, comprising:
   reception circuitry, which is coupled to the control circuitry and which, in operation, receives from the relay user equipment a request to perform a relay discovery procedure to announce the relay user equipment's presence as a relay, wherein
   the transmission circuitry, in operation, transmits to the relay user equipment information on whether and which radio resources are assigned to the relay discovery procedure.

3. The integrated circuit according to claim 1, comprising:
   reception circuitry, which is coupled to the control circuitry and which, in operation, receives from the relay user equipment a relay activation request message requesting permission from the radio base station to activate the relay functionality of the relay user equipment, wherein
   the transmission circuitry, in operation, transmits to the relay user equipment a relay activation response message providing or denying the permission for the relay user equipment to activate the relay functionality.

4. The integrated circuit according to claim 3, wherein the reception circuitry, in operation, receives from the relay user equipment the relay activation request message including a request for radio resources to perform a relay discovery procedure to announce the relay user equipment's presence as a relay, and
   the transmission circuitry, in operation, transmits to the relay user equipment information on whether and which radio resources are assigned to the relay discovery procedure.

5. The integrated circuit according to claim 3, wherein the relay activation request message includes one or more of:
   information on one or more services that can be provided by the relay user equipment to remote user equipments,
   group identification information of one or more services that can be provided by the relay user equipment to remote user equipments, and
   a request for radio resources for the relay user equipment to perform direct discovery to announce the relay user equipment's presence as a direct communication user equipment.

6. The integrated circuit according to claim 1, wherein the broadcast message includes a relay indication indicating that relays are necessary, or includes information on radio resources to be used by the relay user equipment in a relay discovery procedure to announce the relay user equipment's presence as a relay.

7. The integrated circuit according to claim 1, comprising:
   reception circuitry, which is coupled to the control circuitry and which, in operation, receives from the relay user equipment a relay deactivation request message, wherein
   the transmission circuitry, in operation, transmits to the relay user equipment a relay deactivation response message instructing the relay user equipment to deactivate or not to deactivate the relay functionality.

8. The integrated circuit according to claim 1, wherein the radio link quality is determined based on a reference signal receive power (RSRP).

9. The integrated circuit according to claim 1, wherein the radio link quality is determined based on a reference signal received quality (RSRQ).

10. An integrated circuit comprising circuitry which, when incorporated in a radio base station, performs a process including:
    transmitting, to a relay user equipment in a radio cell controlled by the radio base station, a broadcast message indicating minimum and maximum thresholds of a radio link quality of a link between the relay user equipment and the radio base station;
    transmitting, to a remote user equipment, a third threshold value and an offset value, the third threshold value indicating a minimum value of a radio link quality of a Uu link between the remote user equipment and the radio base station; and
    in response to the relay user equipment activating a relay functionality based on that the radio link quality of the link between the relay user equipment and the radio base station is above the minimum threshold and below the maximum threshold and in response to the remote user equipment determining to perform direct communication between the remote user equipment and the relay user equipment based on that the radio link quality of the Uu link is below the third threshold value as adjusted by the offset value, performing communication with the remote user equipment via the relay user equipment that performs the direct communication over a direct link with the remote user equipment.

11. The integrated circuit according to claim 10, wherein the process includes:

receiving from the relay user equipment a request to perform a relay discovery procedure to announce the relay user equipment's presence as a relay; and transmitting to the relay user equipment information on whether and which radio resources are assigned to the relay discovery procedure.

12. The integrated circuit according to claim 10, wherein the process includes:

receiving from the relay user equipment a relay activation request message requesting permission from the radio base station to activate the relay functionality of the relay user equipment; and transmitting to the relay user equipment a relay activation response message providing or denying the permission for the relay user equipment to activate the relay functionality.

13. The integrated circuit according to claim 12, wherein the process includes:

receiving from the relay user equipment the relay activation request message including a request for radio resources to perform a relay discovery procedure to announce the relay user equipment's presence as a relay; and transmitting to the relay user equipment information on whether and which radio resources are assigned to the relay discovery procedure.

14. The integrated circuit according to claim 12, wherein the relay activation request message includes one or more of:

information on one or more services that can be provided by the relay user equipment to remote user equipments, group identification information of one or more services that can be provided by the relay user equipment to remote user equipments, and a request for radio resources for the relay user equipment to perform direct discovery to announce the relay user equipment's presence as a direct communication user equipment.

15. The integrated circuit according to claim 10, wherein the broadcast message includes a relay indication indicating that relays are necessary, or includes information on radio resources to be used by the relay user equipment in a relay discovery procedure to announce the relay user equipment's presence as a relay.

16. The integrated circuit according to claim 10, wherein the process includes:

receiving from the relay user equipment a relay deactivation request message; and transmitting to the relay user equipment a relay deactivation response message instructing the relay user equipment to deactivate or not to deactivate the relay functionality.

17. The integrated circuit according to claim 10, wherein the radio link quality is determined based on a reference signal receive power (RSRP).

18. The integrated circuit according to claim 10, wherein the radio link quality is determined based on a reference signal received quality (RSRQ).

19. The integrated circuit according to claim 10, comprising:

at least one output node coupled to the circuitry, wherein the at least one output node, in operation, outputs data; and at least one input node coupled to the circuitry, wherein the at least one input node, in operation, inputs data.

* * * * *